United States Patent
Kuroda

[11] Patent Number: 6,166,817
[45] Date of Patent: Dec. 26, 2000

[54] OPTICAL DISPLACEMENT MEASUREMENT SYSTEM FOR DETECTING THE RELATIVE MOVEMENT OF A MACHINE PART

[75] Inventor: Akihiro Kuroda, Kanagawa, Japan

[73] Assignee: Sony Precision Technology Inc., Tokyo, Japan

[21] Appl. No.: 09/374,536

[22] Filed: Aug. 16, 1999

[30] Foreign Application Priority Data

Aug. 20, 1998 [JP] Japan ................... 10-234547

[51] Int. Cl.[7] .................................................. G01B 11/02
[52] U.S. Cl. ............................................................. 356/499
[58] Field of Search ........................................ 356/356, 358

[56] References Cited

U.S. PATENT DOCUMENTS

| | | | |
|---|---|---|---|
| 4,930,895 | 6/1990 | Nishimura et al. | 356/356 |
| 4,979,826 | 12/1990 | Ishizuka et al. | 356/356 |
| 5,035,507 | 7/1991 | Nishioki et al. | 356/356 |
| 5,104,225 | 4/1992 | Masreliez | 356/356 |
| 5,448,357 | 9/1995 | Muraki | 356/356 |
| 5,557,396 | 9/1996 | Ishizuka et al. | 356/28.5 |
| 6,005,667 | 12/1999 | Takamiya et al. | 356/356 |

*Primary Examiner*—Robert Kim
*Assistant Examiner*—Phil S. Natividad
*Attorney, Agent, or Firm*—Jay H. Maioli

[57] ABSTRACT

An optical displacement measurement system can detect a position of an object with an enhanced degree of resolution by providing, a coherent beam La is focussed on the lattice plane of a diffraction grating 1 by a first focussing element 4 and, at the same time, a first pair of diffracted beam Lb1, Lb2 are collimated and made to irradiate a reflection optical system 3 perpendicularly by a second focussing element 5. Thus, if the optical axis of the first diffracted beam Lb1 is displaced, the first diffracted beam Lb1 follows the same optical path and focussed on the lattice plane of the diffraction grating at the same spot when reflected by the reflection optical system so that the optical axis of the second diffracted beam Lb2 produced from the first diffracted beam Lb1 as the latter is diffracted will never be displaced. Therefore, the second diffracted beam that is free from any displacement of the optical axis is made to interfere with another second diffracted beam to detect the phase difference thereof and determine the displaced position of the diffraction grating 1.

11 Claims, 23 Drawing Sheets

DERECTIONS $C_1, C_2$ : LATTICE DIRECTIONS

DERECTIONS $D_1, D_2$ : LATTICE VECTOR DIRECTIONS

DERECTIONS $E_1, E_2$ : NORMAL VECTOR DIRECTIONS

OPTICAL DISPLACEMENT MEASUREMENT SYSTEM FOR DETECTING THE RELATIVE MOVEMENT OF A MACHINE PART

BACKGROUND OF THE INVENTION

1. Field of the Invention

This invention relates to an optical displacement measurement system for detecting the relative movement, if any, of a movable part of a semiconductor manufacturing apparatus, a machine tool or some other apparatus.

2. Description of Related Art

Optical displacement measurement systems utilizing a diffraction grating to detect the relative movement of a movable part of an apparatus such as a semiconductor manufacturing apparatus or a machine tool are known.

For example, FIGS. 1 and 2 of the accompanying drawings show a known optical displacement measurement system described in Japanese Patent Application Laid-Open No. 60-98302. FIG. 1 is a schematic perspective view of the known optical displacement measurement system 100 and FIG. 2 is a schematic view of the optical displacement measurement system 100 as viewed along arrow N1 in FIG. 1.

This known optical displacement measurement system 100 comprises a diffraction grating 101 adapted to linearly move in directions indicated respectively by arrows X1 and/or X2 in the drawings in response to a movement of the movable part of a machine tool, a coherent light source 102 for emitting a coherent laser beam, a halfmirror 103 for dividing the laser beam emitted from the coherent light source 102 into two beams and causing the two diffracted beams from the diffraction grating 101 to overlap and interfere with each other, a pair of mirrors 104a, 104b for reflecting the respective beams diffracted by the diffraction grating 101 and a photodetector 105 for receiving the two diffracted beams and generating an interference signal.

The laser beam emitted from the coherent light source 102 is split into two beams by the half mirror 103. Then, the two beams are made to strike the diffraction grating 101. The two beams striking the diffraction grating 101 are then diffracted by the diffraction grating 101 and leave the latter as diffracted beams. The two primary diffracted beams diffracted by the diffraction grating 101 are subsequently reflected by the mirrors 104a, 104b respectively. The diffracted beams reflected by the respective mirrors 104a, 104b are made to strike the diffraction grating 101 once again and diffracted by the diffraction grating 101 for another time before being returned to the half mirror 103, reversely following the same light paths. The diffracted beams returned to the half mirror 103 are caused to overlap and interfere with each other before being detected by the photodetector 105.

With the known optical displacement measurement system 100, the diffraction grating 101 moves in directions indicated by arrows X1, X2 respectively. Then, in the optical displacement measurement system 100, the two diffracted beams produced by the diffraction grating 101 show a phase difference as a function of the movement of the diffraction grating 101. Thus, the optical displacement measurement system 101 can determine the displacement of the movable part of the machine tool by detecting the phase difference of the two diffracted beams from the interference signal produced by the photodetector 105.

FIGS. 3 and 4 of the accompanying drawings show another known optical displacement measurement system described in Japanese Patent Application Laid-Open No. 60-98302. FIG. 3 is a schematic perspective view of the known optical displacement measurement system 110 and FIG. 4 is a schematic view of the optical displacement measurement system 110 as viewed along arrow N1 in FIG. 3.

This known optical displacement measurement system 110 comprises a diffraction grating 111 adapted to linearly move in directions indicated respectively by arrows X1 and/or X2 in the drawings in response to a movement of the movable part of a machine tool, a coherent light source 112 for emitting a coherent laser beam, a half mirror 113 for dividing the laser beam emitted from the coherent light source 112 into two beams and causing the two diffracted beams from the diffraction grating 111 to overlap and interfere with each other, a first pair of mirrors 114a, 114b for reflecting the respective beams diffracted by the diffraction grating 101 to a same and identical spot on the diffraction grating 111 and a second pair of mirrors 115a, 115b for reflecting the respective diffracted beams diffracted by the diffraction grating 111 and a photodetector 116 for receiving the two diffracted beams and generating an interference signal.

The laser beam emitted from the coherent light source 112 is split into two beams by the half mirror 113. Then, the two beams are reflected respectively by the first pair of mirrors 114a, 114b and made to strike the diffraction grating 101 at a same and identical spot. The two beams striking the diffraction grating 101 are then diffracted by the diffraction grating 111 and leave the latter as diffracted beams. The two primary diffracted beams diffracted by the diffraction grating 111 are subsequently reflected by the second pair of mirrors 115a, 115b respectively. The diffracted beams reflected by the second pair of mirrors 104a, 104b are made to strike the diffraction grating 101 once again and diffracted by the diffraction grating 111 for another time before being returned to the halfmirror 113, reversely following the same light paths. The diffracted beams returned to the half mirror 113 are caused to overlap and interfere with each other before being detected by the photodetector 116.

With the known optical displacement measurement system 110, the diffraction grating 111 moves in directions indicated by arrows X1, X2 respectively. Then, in the optical displacement measurement system 110, the two diffracted beams produced by the diffraction grating 111 show a phase difference as a function of the movement of the diffraction grating 111. Thus, the optical displacement measurement system 111 can determine the displacement of the movable part of the machine tool by detecting the phase difference of the two diffracted beams from the interference signal produced by the photodetector 116.

Now, with the trend of enhanced high precision of machine tools and industrial robots in recent years, optical displacement measurement systems of the type under consideration are required more often than not to have a position detecting capability with a degree of resolution of tens of several nanometers to several nanometers.

For an optical displacement measurement system to have a high degree of resolution, it is required to detect a large interference signal. Then, the two diffracted beams to be made to interfere with each other have to be overlapped with a very high degree of precision.

However, with either of the above described known optical displacement measurement systems 100, 110, the diffracted beams can become displaced from each other to abruptly dwarf the interference signal and make it impossible to detect the position of the movable part if the diffraction grating 101 or 111, whichever appropriate, is moved in a direction other than the right direction of movement or has undulations. For example, if the diffraction grating 101 or 111 is rotated in the directions of arrows A1 and A2 of B1 and B2 as shown in FIGS. 1 through 4, it is no longer possible to detect the position of the movable part of the machine tool that is under scrutiny.

FIG. 5 of the accompanying drawings shows an optical displacement measurement system 120 obtained by modifying the above described known optical displacement measurement system 100. Referring to FIG. 5, it has a first lens 106 for focussing the laser beams emitted from the coherent light source 102 on the mirrors 104a, 104b and a second lens 107 for focussing the two diffracted beams that have been made to overlap and interfere with each other by the half mirror 103 on the light receiving plane of the photodetector 105.

However, this optical displacement measurement system 120 is also not free from the above pointed out problem that the diffracted beams can become displaced from each other to abruptly dwarf the interference signal and make it impossible to detect the position of the movable part if the diffraction grating 101 is moved in a direction other than the right direction of movement or has undulations.

For instance, if the diffraction grating 101 is angularly moved by about 1/60 of a degree in the directions of arrows A1 and A2 and about 1/6 of a degree in the directions of arrows B1 and B2, the magnitude of the interference signal will change by 20%. If a reflection type diffraction grating is used, the angle of tolerance in the directions of arrow B1 and B2 will be reduced to a fraction of the above cited value to make it further difficult to detect the position of the movable part.

FIG. 6 of the accompanying drawings illustrates a known optical displacement measurement system described in Japanese Patent Application Laid-Open No. 2-167427.

Referring to FIG. 6, the optical displacement measurement system 130 comprises a diffraction grating 131 adapted to linearly move in directions indicated respectively by arrows X1 and/or X2 in the drawings in response to a movement of the movable part of a machine tool, a laser diode 132 for emitting a laser beam, a first half mirror 133 for dividing the laser beam emitted from the laser diode 132, first and second light receiving elements 134, 135 for receiving the two diffracted beams transmitted through the diffraction grating 131, a pair of lenses 136, 137 for focussing the two diffracted beams respectively and a second halfmirror 138 for separating and synthetically combining the two diffracted beams focussed by the pair of lenses 136, 137.

The optical displacement measurement system 130 further comprises a first pair of mirrors 139, 140 for reflecting the laser beams produced by the halfmirror 133 and causing them to strike the diffraction grating 131, a second pair of mirrors 141, 142 for reflecting the laser beams transmitted by the diffraction grating 131 and causing them to strike the half mirror 138, a ¼ wave plate 143 and a first analyser 144 arranged between the first light receiving element 143 and the half mirror 138 and a second analyser 145 arranged between the second light receiving element 135 and the half mirror 138.

In the optical displacement measurement system 130, the first and second lenses 136, 137 are arranged in such a way that they focus respective beams on the diffraction plane or the refraction plane of the diffraction grating 11. Therefore, the diffracted beams respectively striking the first and second light receiving elements are always held in parallel with each other and the interference signal will fluctuate little if the diffraction grating 131 shows undulations.

However, the proposed optical displacement measurement system 130 only ensures the parallelism of the two diffracted beams. That is, if the diffraction grating 131 is inclined, a uniform interference will be maintained only in the shaded area in FIG. 7 where the two beams are made to overlap with each other. In other words, the two diffracted beams do not interfere with each other in areas other than the area where the two beams are made to overlap with each other so that consequently the obtained interference signal will become dwarfed. Additionally, if the two beams are not strictly parallel relative to each other and involve aberration in any sense of the word, no uniform interference will be ensured even in the area where the two beams are made to overlap with each other.

SUMMARY OF THE INVENTION

Therefore, it is an object of the present invention to provide an optical displacement measurement system that can detect the position of a movable part of a machine tool with an enhanced degree of resolution.

Another object of the present invention is to provide an optical displacement measurement system with which any beam reflected by the diffraction grating thereof does not return to the light emitting means of the system so that the position of a movable part of a machine tool can be detected reliably with an enhanced degree of resolution.

According to the invention, the above objects and other objects of the invention are achieved by providing an optical displacement measurement system characterized by comprising a diffraction grating adapted to be irradiated with a coherent beam of light and move in directions parallel to the lattice vector relative to the coherent beam to diffract the coherent beam, a light emitting means for emitting a coherent beam of light, an irradiation optical system for dividing the coherent beam of light emitted from said light emitting means into two coherent beams of light and irradiating said diffraction grating with each of the coherent beams, a reflection optical system for reflecting each of a first pair of diffracted beams obtained from said coherent beams through diffraction by said diffraction grating, an interference optical system for causing each of a second pair of diffracted beams obtained through diffraction by said diffraction grating to interfere with each other, a light receiving means for receiving the second pair of diffracted beams interfering with each other and detecting an interference signal and a position detecting means for determining the phase difference of said second pair of diffracted beams from the interference signal detected by said light receiving means and detecting the position of the relatively moved diffraction grating, said irradiation optical system having a first focussing means for focussing the two coherent beams irradiating the diffraction grating on the lattice plane of the diffraction grating, said reflection optical system having a second focussing means for focussing said first pair of diffracted beams irradiating said diffraction grating on respective spots same as those of the corresponding focussed coherent beams.

With an optical displacement measurement system having a configuration as described above and schematically illustrated in FIG. 8, the first focussing means 4 focusses the coherent beam of light La emitted from the light emitting means 2 on the lattice plane of the diffraction grating 1. Then, the coherent beam La focussed on the lattice plane of the diffraction grating 1 is diffracted by the diffraction grating 1 to produce a first diffracted beam Lb1 as a result of reflection or transmission by the diffraction grating 1. Then, the second focussing means 5 collimates the first diffracted beam Lb1 and causes it to irradiate the reflection optical system 3 perpendicularly. Then, the reflection optical system 3 causes the first diffracted beam Lb1 to move back through the same optical path the beam followed to irradiate it. The second focussing means 5 focusses the reflected first diffracted beam Lb1 on the lattice plane of the diffraction grating 1. Then, the reflected first diffracted beam Lb1 is focussed on the spot where the coherent beam La is focussed by the first focussing means 4. The reflected first diffracted beam Lb1 is diffracted by the diffraction grating 1 to produce the second diffracted beam Lb2 as a result of reflection or diffraction by the diffraction grating 1.

With an optical displacement measurement system having a configuration as described above, the coherent beam La is focussed on the lattice plane of the diffraction grating 1 by the first focussing means 4 and, at the same time, the first pair of diffracted beams Lb1, Lb2 collimated by the second focussing means 5 are constantly made to perpendicularly irradiate the reflector of the reflection optical system 3. Thus, if the optical axis of one of the first pair of diffracted beams, or the diffracted beam Lb1, is displaced typically as indicated by Lb1' in FIG. 8, said diffracted beam Lb1 of the first pair of diffracted beam always moves back the same optical path it followed to irradiate the reflection optical system so that the optical axis of the other one of the first pair of diffracted beams, or the diffracted beam Lb2, that is produced through diffraction of the first one of the first pair of diffracted beams, or the diffracted beam Lb1 will not be displaced. Thus, the length of the optical path will not be changed either.

Thus, an optical displacement measurement system according to the invention is characterized in that said irradiation optical system forms optical paths on an inclined plane perpendicular to the lattice plane of the diffraction grating for the two diffracted beams respectively and causes the two coherent beams to irradiate the lattice plane of the diffraction grating at a same and identical spot.

With an optical displacement measurement system according to the invention, optical paths are formed in a direction inclined relative to the direction perpendicular to the lattice plane of the diffraction grating for two coherent beams and the two coherent beams are made to irradiate the lattice plane of the diffraction grating at a same and identical spot. Then, with the optical displacement measurement system, the phase difference between the two diffracted beams produced from the coherent beams is determined to detect the relatively displaced position of the diffraction grating.

DETAILED DESCRIPTION OF THE PREFERRED EMBODIMENT

Now, the present invention will be described by way of a first embodiment of optical displacement measurement system according to the invention.

Figure 1:
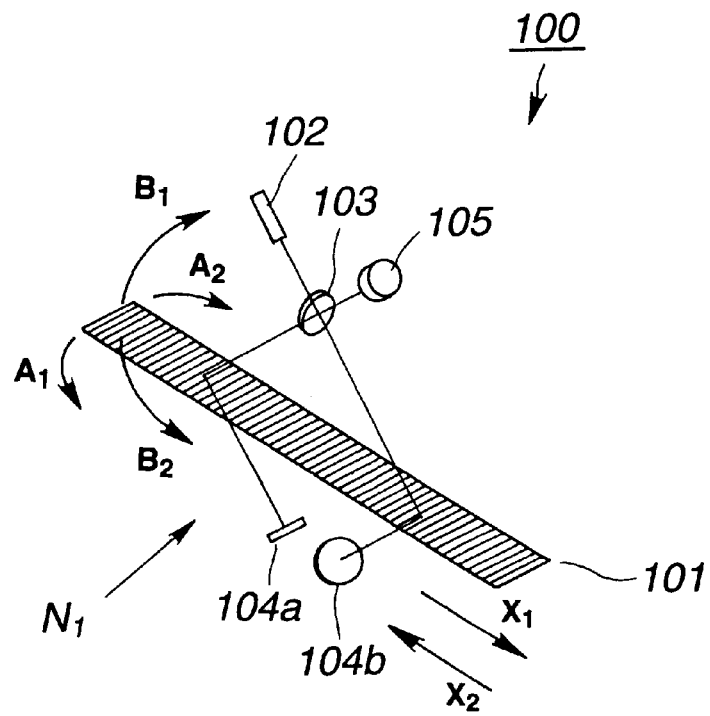
FIG. 1 is a schematic perspective view of a known optical displacement measurement system described in Japanese Patent Application Laid-Open No. 60-98302.
Figure 2:
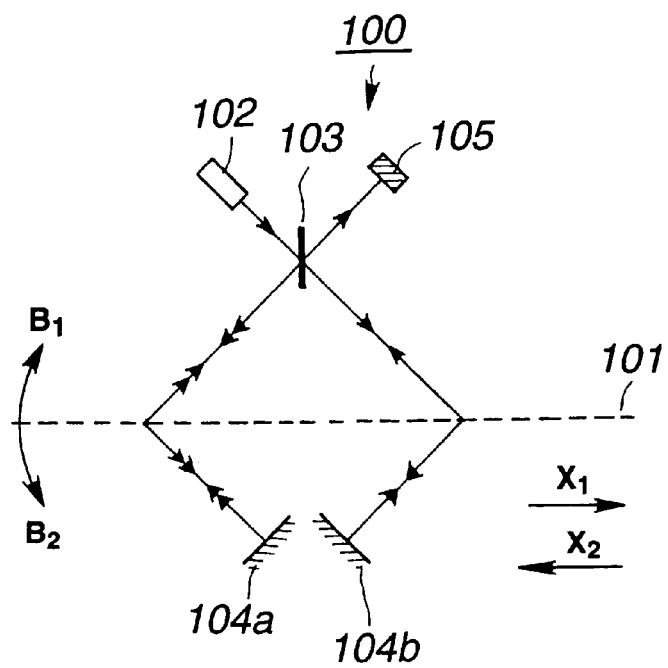
FIG. 2 is a schematic view of the optical displacement measurement system of FIG. 1 as viewed along direction N1 in FIG. 1.
Figure 3:
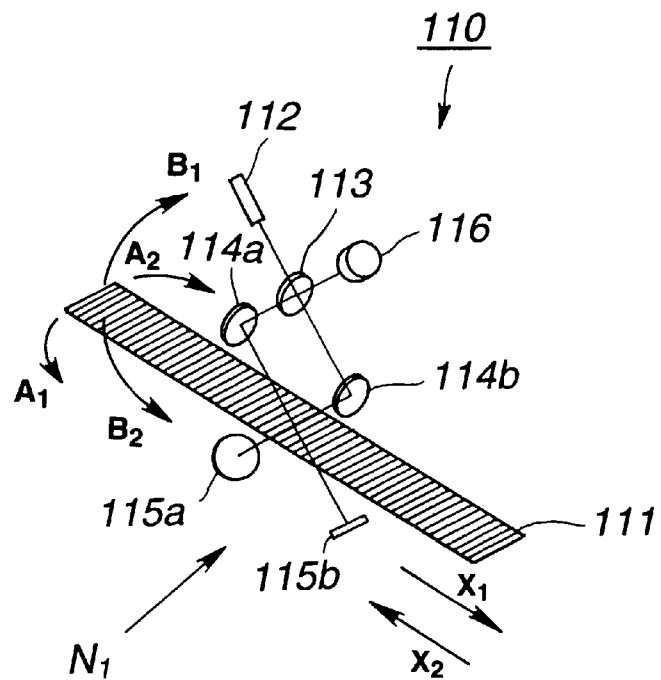
FIG. 3 is a schematic perspective view of another known optical displacement measurement system described in Japanese Patent Application Laid-Open No. 60-98302.
Figure 4:
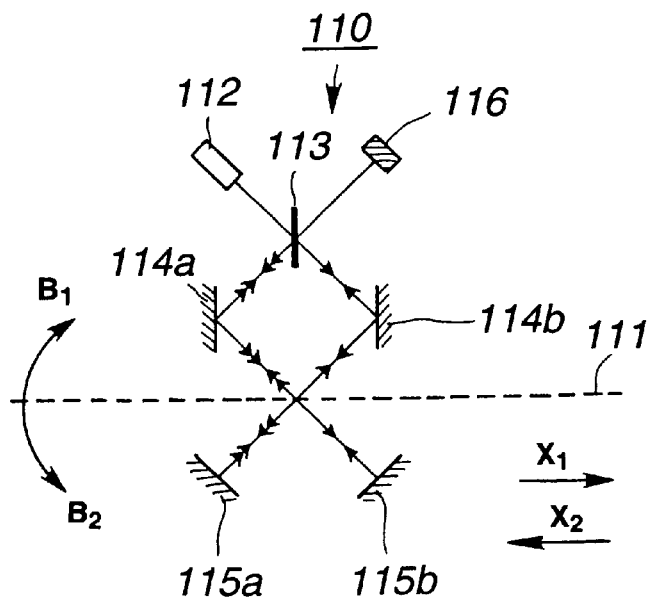
FIG. 4 is a schematic view of the optical displacement measurement system of FIG. 3 as viewed along direction N1 in FIG. 1.
Figure 5:
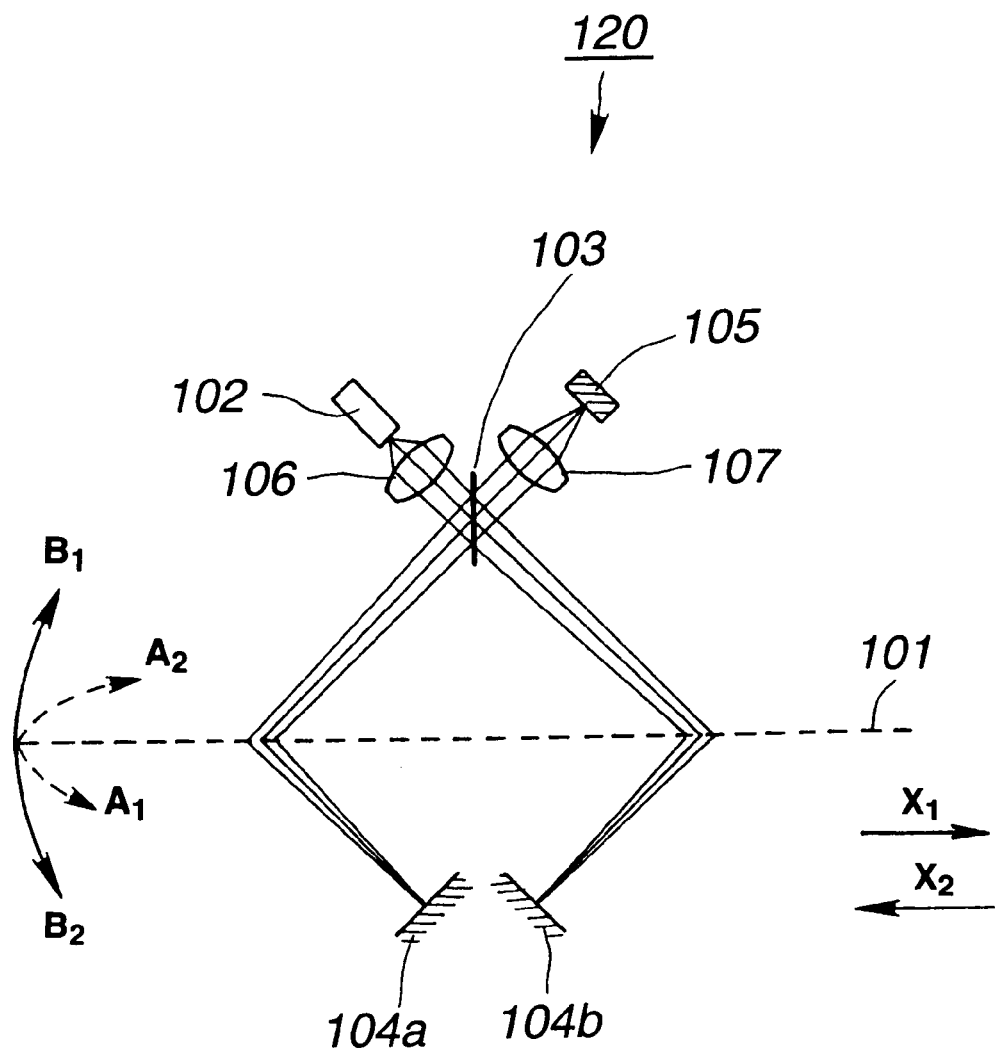
FIG. 5 is a schematic view illustrating the operation of an optical displacement measurement system obtained by modifying the known optical displacement measurement system of FIG. 1.
Figure 6:
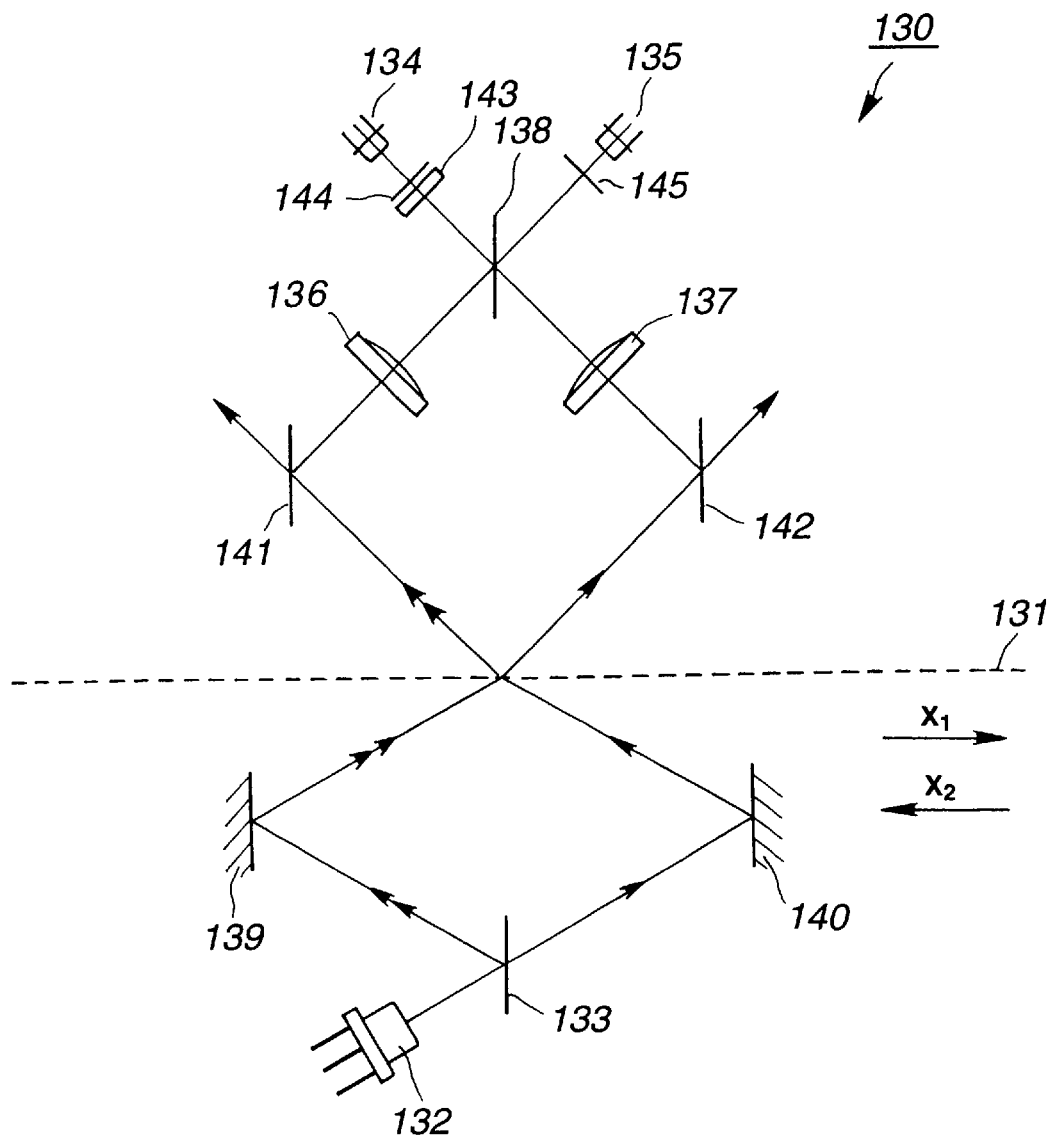
FIG. 6 is a schematic perspective view of still another known optical displacement measurement system described in Japanese Patent Application Laid-Open No. 2-167427.
Figure 7:
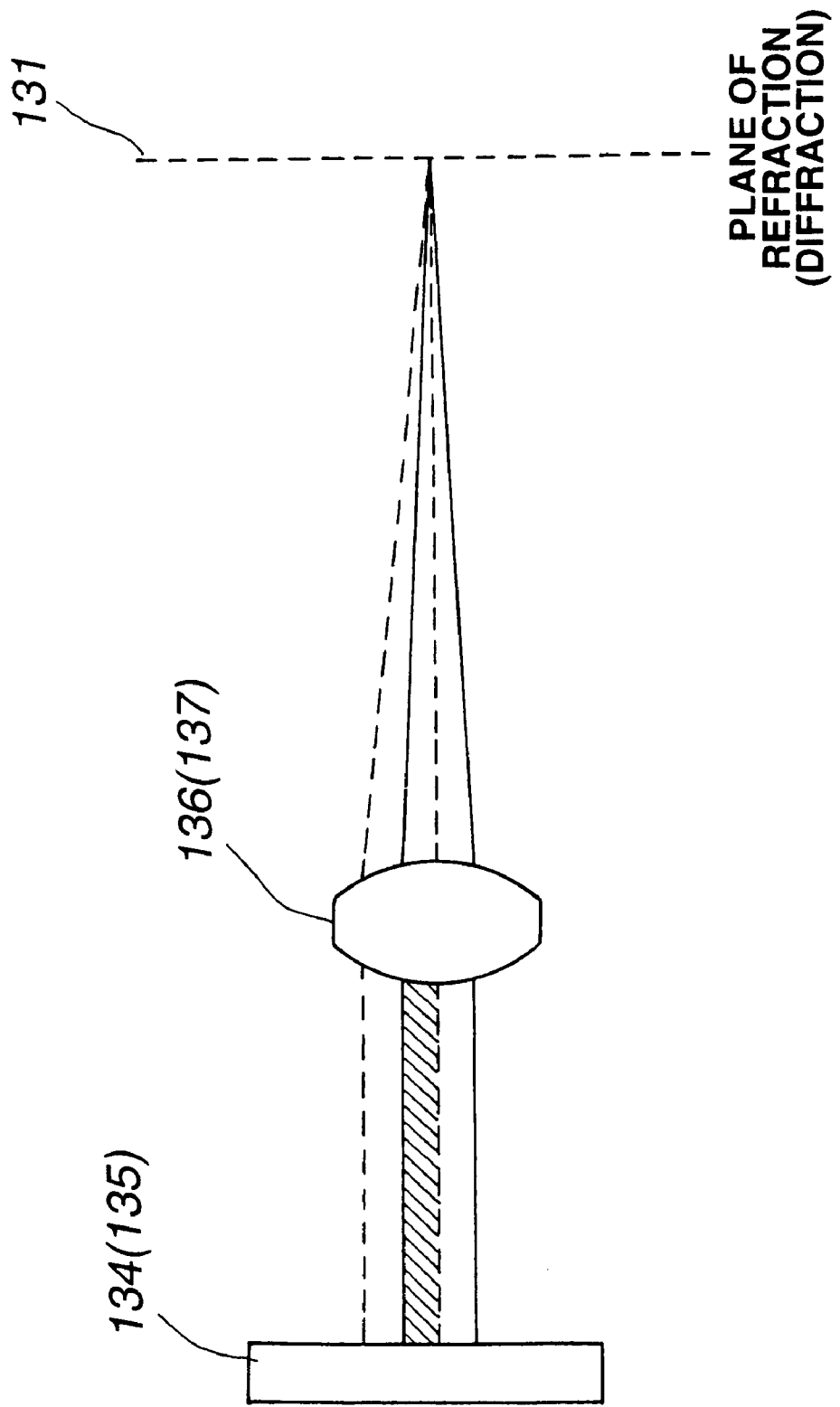
FIG. 7 is a schematic view illustrating the operation of the light receiving element irradiated with diffracted beams of light of an optical displacement measurement system of Japanese Patent Application Laid-Open No. 2-167427.
Figure 8:
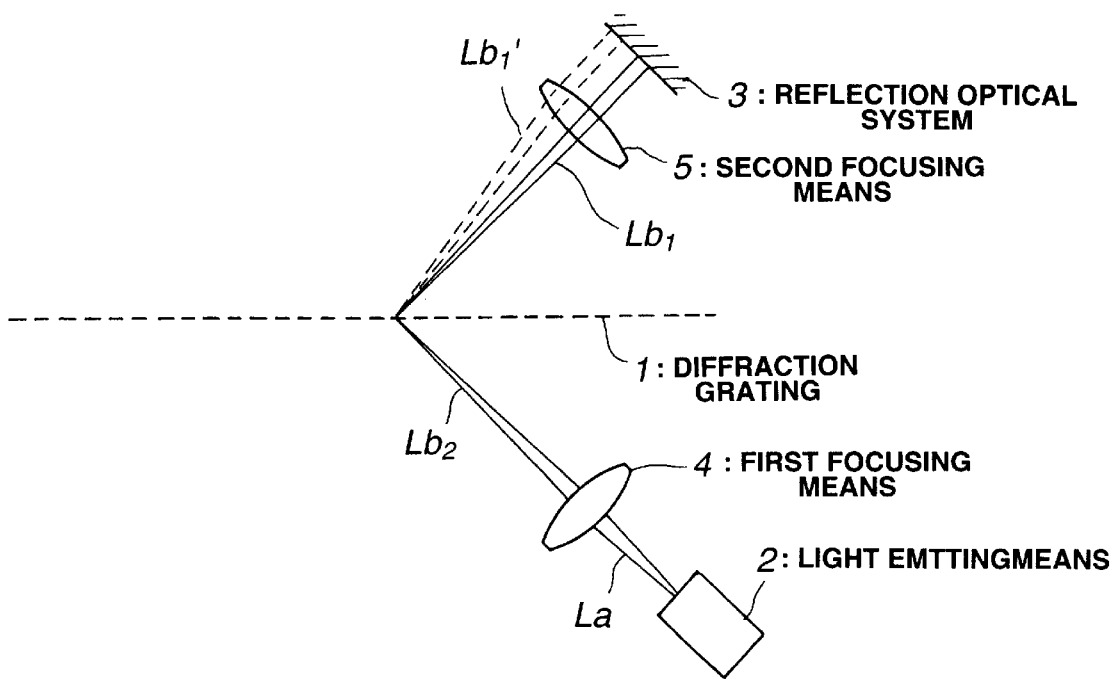
FIG. 8 is a schematic view of an optical displacement measurement system according to the invention.
Figure 9:
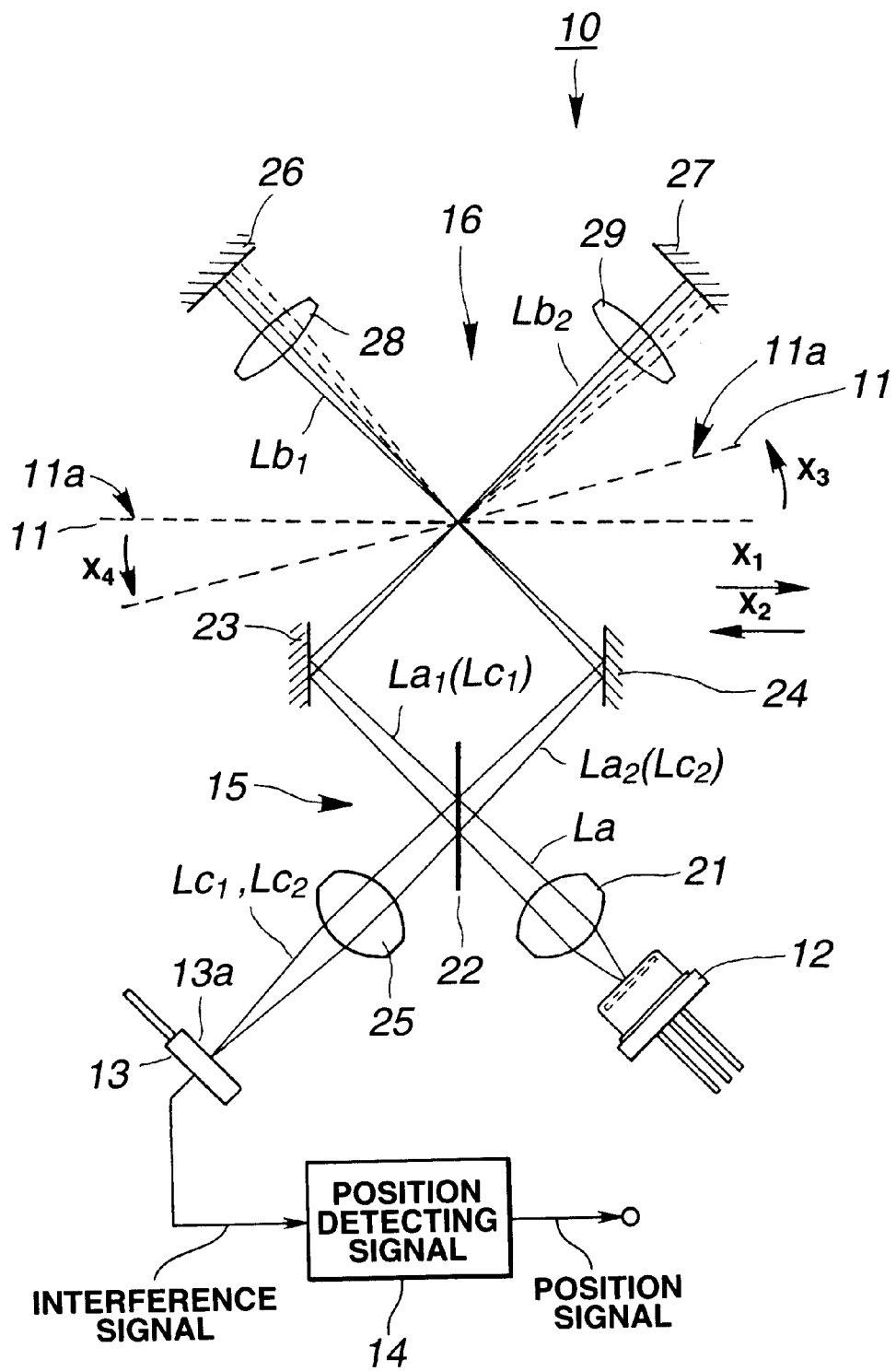
FIG. 9 is a schematic view of a first embodiment of optical displacement measurement system according to the present invention.

Referring to FIG. 9 illustrating the first embodiment of optical displacement measurement system 10 according to the invention, it comprises a diffraction grating 11 adapted to be fitted to a movable part of a machine tool and move linearly, a coherent light source 12 for emitting a coherent beam of light La such as a laser beam, a light receiving element 13 for receiving two interfering diffracted beams Lc1, Lc2 to generate an interference signal, a position detecting section 14 for detecting the displaced position of the diffraction grating 11 on the basis of the interference signal from the light receiving element 13, an irradiation/reception optical system 15 for splitting the coherent beam La emitted from the coherent light source 12 into two coherent beams La1, La2 and causing the diffraction grating 11 to be irradiated with the obtained beams while causing the twice-diffracted beams Lc1, Lc2 from the diffraction grating 11 to interfere with each other and irradiate the light receiving element 13 and a reflection optical system 16 for reflecting the once-diffracted beams Lb1, Lb2 from the diffraction grating 11 to irradiate again the diffraction grating 11.

Figure 10:
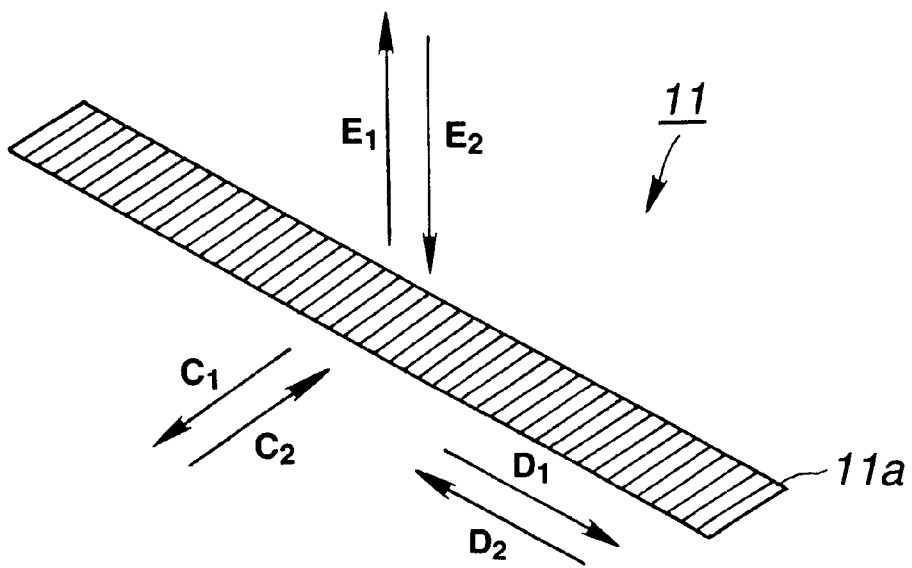
FIG. 10 is a schematic perspective view of a diffraction grating that can be used for the first through fourth embodiments of the present invention.

Referring to FIG. 10, the diffraction grating 11 has a profile like that of a thin plate and provided with a latticework of narrow slits or grooves arranged at regular intervals on the surface. A beam of light striking the diffraction grating 11 is diffracted by the latticework formed on the surface thereof. The diffracted beam is then transmitted in a direction defined by the intervals of the lattice and the wavelength of the beam.

For the purpose of describing the embodiment, the surface of the diffraction grating 11 where the latticework is formed will be referred to hereinafter as lattice plane 11a. If the diffraction grating 11 is of a transmission type, both the surface through which a coherent beam enters the diffraction grating and the surface from which a diffracted beam is transmitted away will be referred to as lattice plane 11a. The directions along which the latticework of the diffraction grating 11 is formed (directions indicated by arrows C1 and C2 in FIG. 10) that are the directions perpendicular to the lattice vector representing changes in the transitivity, reflectivity and the depth of the latticework and parallel to the lattice plane 11a will be referred to as lattice directions. The directions perpendicular to the direction along which the latticework is formed and parallel to the lattice plane 11a (directions indicated by arrows D1 and D2 in FIG. 10) that are the directions parallel to the lattice vector of the diffraction grating 11 will be referred to as lattice vector directions. Finally, the directions perpendicular to the lattice plane 11a (directions indicated by arrows E1 and E2 in FIG. 10) that are the directions perpendicular to the directions along which the latticework is formed and also to the lattice vector will be referred to as normal vector directions. Note that these denominations of the directions of a diffraction grating 11 will also be used in the description of the other embodiments that follows.

The diffraction grating 11 is fitted to a movable part of a machine tool and moved in the lattice vector directions as indicated by arrows X1 and X2 in FIG. 9 along with the movable part.

The coherent light source 12 is a device adapted to emit a coherent beam such as a laser beam. The coherent light source 12 is typically a multi-mode semiconductor laser adapted to emit a laser beam with a coherence length of about several hundred $\mu$m.

The light receiving element 13 is a photoelectric conversion element adapted to convert the light irradiating the light receiving plane 13a thereof into an electric signal representing the quantity of light it receives. It may typically comprise a photodetector. The light receiving element 13 receives a coherent beam of light irradiating the light receiving plane 13a and generates an interference signal representing the quantity of light it receives.

The position detecting section 14 outputs a position signal indicating the relatively displaced position of the diffraction grating 11 by determining the phase difference of the two-diffracted beam of light Lc1 and the twice-diffracted beam of light Lc2 on the basis of the interference signal generated by the light receiving element 13.

The irradiation/reception optical system 15 comprises a first focussing element 21 for focussing the coherent beam La emitted from the coherent light source 12 on the lattice plane 11a of the diffraction grating 11, a half mirror 22 for splitting the coherent beam La emitted from the coherent light source 12 into two coherent beams La1, La2 and causing the two twice-diffracted beams Lc1, Lc2 from the diffraction grating 11 to overlap and interfere with each other, a reflector 23 for reflecting one of the coherent beams, or coherent beam La1, produced by the half mirror 22 and the twice-diffracted beam produced from the coherent beam La 1, another reflector 24 for reflecting the other coherent beam, or coherent beam La2, produced by the halfmirror 22 and the twice-diffracted beam Lc2 produced from the coherent beam La2 and a second focussing element 25 for focussing the two twice-diffracted beams Lc1, Lc2 caused to overlap with each other by the halfmirror 22 on the light receiving plane 13a of the light receiving element 13.

The first focussing element 21 comprises an optical element that may be a lens having a predetermined variable range of numerical aperture. The coherent beam La emitted from the coherent light source 12 is made to enter the first focussing element 21. The first focussing element 21 focusses the entered coherent beam La on the lattice plane 11a of the diffraction grating 11 with a predetermined beam diameter. Preferably, the beam diameter of the focussed beam covers a number of grooves sufficient for the diffraction grating 11 to produce a diffracted beam. The beam diameter is preferably such that the beam may not be affected by the fine pieces of dust and/or the scars on the lattice plane 11a. Preferably, the beam diameter may be adjusted by adjusting the numerical aperture and typically not smaller than tens of several μm. The focal point may not necessarily be the point where the beam diameter is minimized. A point on the lattice plane 11 that minimizes the difference of the lengths of the optical paths of two beams may alternatively be selected for the focal point.

The coherent beam La emitted from the coherent light source 12 is made to enter the half mirror 22 by way of the first focussing element 21. The half mirror 22 transmits part of the incident coherent beam La to generate a coherent beam La1 and reflects the rest of the incident coherent beam La to generate a coherent beam La2. The half mirror 22 also receives the twice-diffracted beam Lc1 and the twice-diffracted beam Lc2 from the diffraction grating 11. Then, the half mirror 22 causes the two twice-diffracted beams Lc1, Lc2 to overlap and interfere with each other and irradiate the light receiving plane 13a of the light receiving element 13 with the twice-diffracted beams Lc1, Lc2 that are interfering with each other.

The reflector 23 reflects the coherent beam La1 transmitted through the half mirror 22 and makes it strike the lattice plane 11a of the diffraction grating 11 at a predetermined spot. The reflector 24, on the other hand, reflects the coherent beam La2 reflected by the half mirror 22 and makes it strike the lattice plane 11a of the diffraction grating 1 at the predetermined spot. Thus, the reflector 23 and the reflector 24 make the respective coherent beams La1 and La2 strike a same spot on the lattice plane 11a.

The reflector 23 is also irradiated with the twice-diffracted beam Lc1 produced from the once-diffracted beam Lb1 as the latter irradiates the diffraction grating 11. Then, the reflector 23 reflects the twice-diffracted beam Lc1 to make it irradiate the half mirror 22. On the other hand, the reflector 24 is irradiated with the twice-diffracted beam Lc2 produced from the once-diffracted beam Lb2 as the latter irradiates the diffraction grating 11. Then, the reflector 24 reflects the twice-diffracted beam Lc2 to make it irradiate the half mirror 22. Both the reflector 23 and the reflector 24 are irradiated with the twice-diffracted beams Lc1, Lc2 produced from the same spot on the lattice plane 11.

The second focussing element 25 comprises an optical element that may be a lens having a predetermined variable range of numerical aperture. The two twice-diffracted beams Lc1, Lc2 that are made to overlap with each other by the half mirror 22 are made to enter the second focussing element 25. The second focussing element 25 focusses the entered two twice-diffracted beams Lc1, Lc2 on the light receiving plane 13a of the light receiving element 13 with a predetermined beam diameter. The focal point may not necessarily be the point where the beam diameter is minimized. A point on the lattice plane 11 that in minimizes the difference of the lengths of the optical paths of two beams may alternatively be selected for the focal point.

Finally, the reflection optical system 16 comprises a reflector 26 for reflecting the once-diffracted beam Lb1 produced from the coherent beam La1 and making it irradiate the diffraction grating 11 once again, another reflector 27 for reflecting the once-diffracted beam Lb2 produced from the coherent beam La2 and making it irradiate the diffraction grating 11 once again, a third focussing element 28 for collimating the once-diffracted beam Lb1 produced from the coherent beam La1 and making it irradiate the reflector 26 and a fourth focussing element 29 for collimating the once-diffracted beam Lb2 produced from the coherent beam La2 and making it irradiate the reflector 27.

The reflector 26 is irradiated with the once-diffracted beam Lb1 after the latter passes through the third focussing element 28. Then, the reflector 26 reflects the once-diffracted beam Lb1 perpendicularly to make it follow the same optical path.

The reflector 27 is irradiated with the once-diffracted beam Lb2 after the latter passes through the fourth focussing element 29. Then, the reflector 27 reflects the once-diffracted beam Lb2 perpendicularly to make it follow the same optical path.

The third focussing element 28 comprises an optical element that may be a lens having a predetermined variable range of numerical aperture. The once-diffracted beam Lb1 produced from the coherent beam La1 is made to enter the third focussing element 28. The once-diffracted beam Lb1 is also made to enter the third focussing element 28 after it is reflected by the reflector 26 along the direction opposite to the direction along which it enters the third focussing element 28 from the diffraction grating 11. Then, the third focussing element 28 collimates the once-diffracted beam Lb1 entering it from the diffraction grating 11 and makes it irradiate the reflector 26. Finally, the third focussing element 28 focusses the once-diffracted beam Lb1 reflected perpendicularly by the reflector 26 on the lattice plane 11a of the diffraction grating 11 at the same spot where the coherent beam La1 strikes the lattice plane 11a.

The fourth focussing element 29 comprises an optical element that may be a lens having a predetermined variable range of numerical aperture. The once-diffracted beam Lb2 produced from the coherent beam La2 is made to enter the fourth focussing element 29. The once-diffracted beam Lb2 is also made to enter the fourth focussing element 29 after it is reflected by the reflector 27 along the direction opposite to the direction along which it enters the fourth focussing element 29 from the diffraction grating 11. Then, the fourth focussing element 29 collimates the once-diffracted beam Lb2 entering it from the diffraction grating 11 and makes it irradiate the reflector 27. Finally, the fourth focussing element 29 focusses the once-diffracted beam Lb2 reflected perpendicularly by the reflector 27 on the lattice plane 11a of the diffraction grating 11 at the same spot where the coherent beam La2 strikes the lattice plane 11a.

Thus, the reflection optical system 16 reflects the once-diffracted beams Lb1, Lb2 produced as the coherent beams La1, La2 are diffracted and irradiates the diffraction grating 11 once again. The once-diffracted beams Lb1, Lb2 entering the diffraction grating 11 once again are diffracted by the diffraction grating 11. The twice-diffracted beams Lc1, Lc2 produced as the once-diffracted beams Lb1, Lb2 are diffracted are made to reversely follow the optical paths same as those of the coherent beams La1, La2 and irradiate the half mirror 22 of the irradiation/reception optical system 15.

Figure 11:
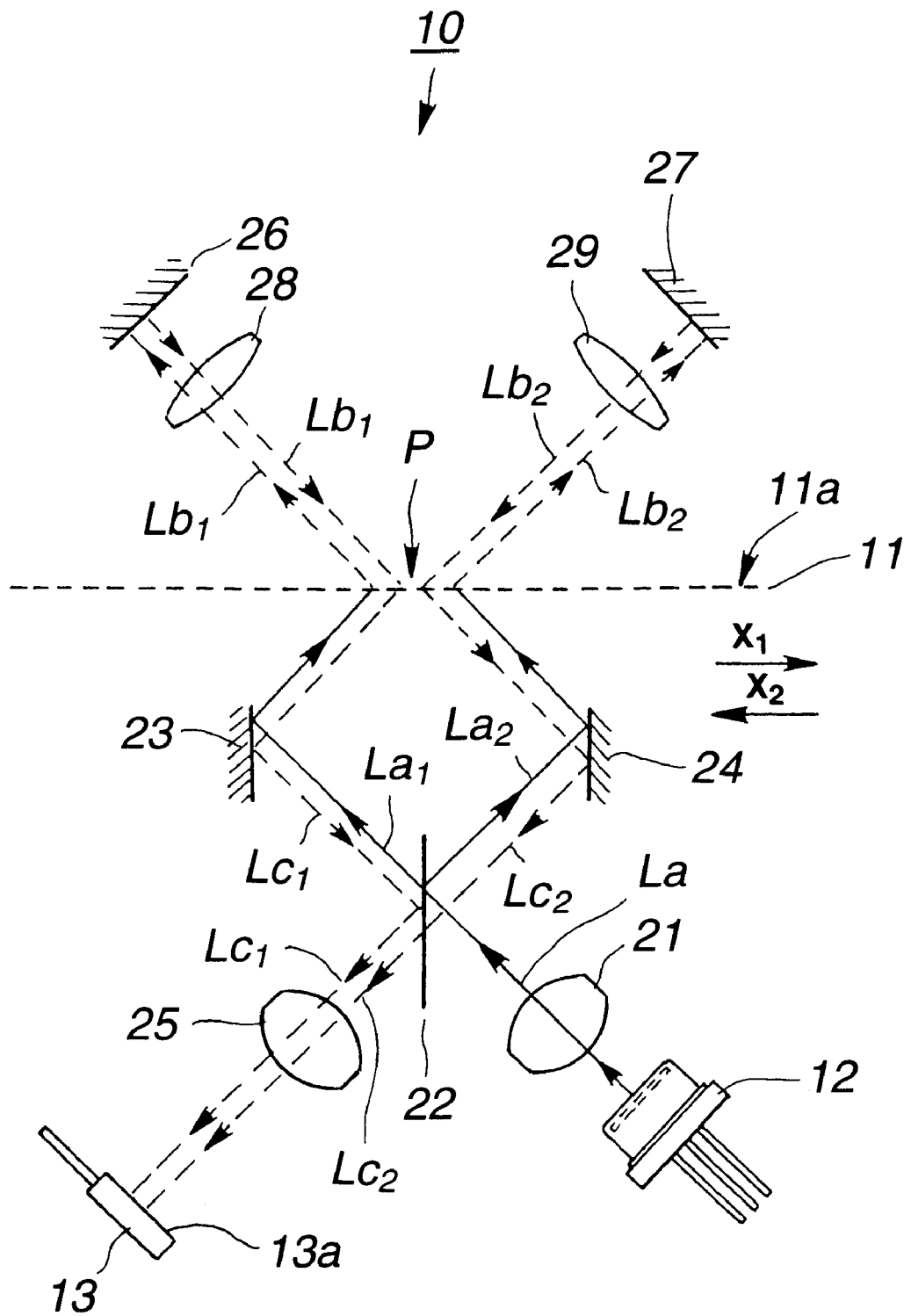
FIG. 11 is a schematic illustration of the optical paths of coherent beams and diffracted beams of the first embodiment of optical displacement measurement system according to the present invention.
Figure 12:
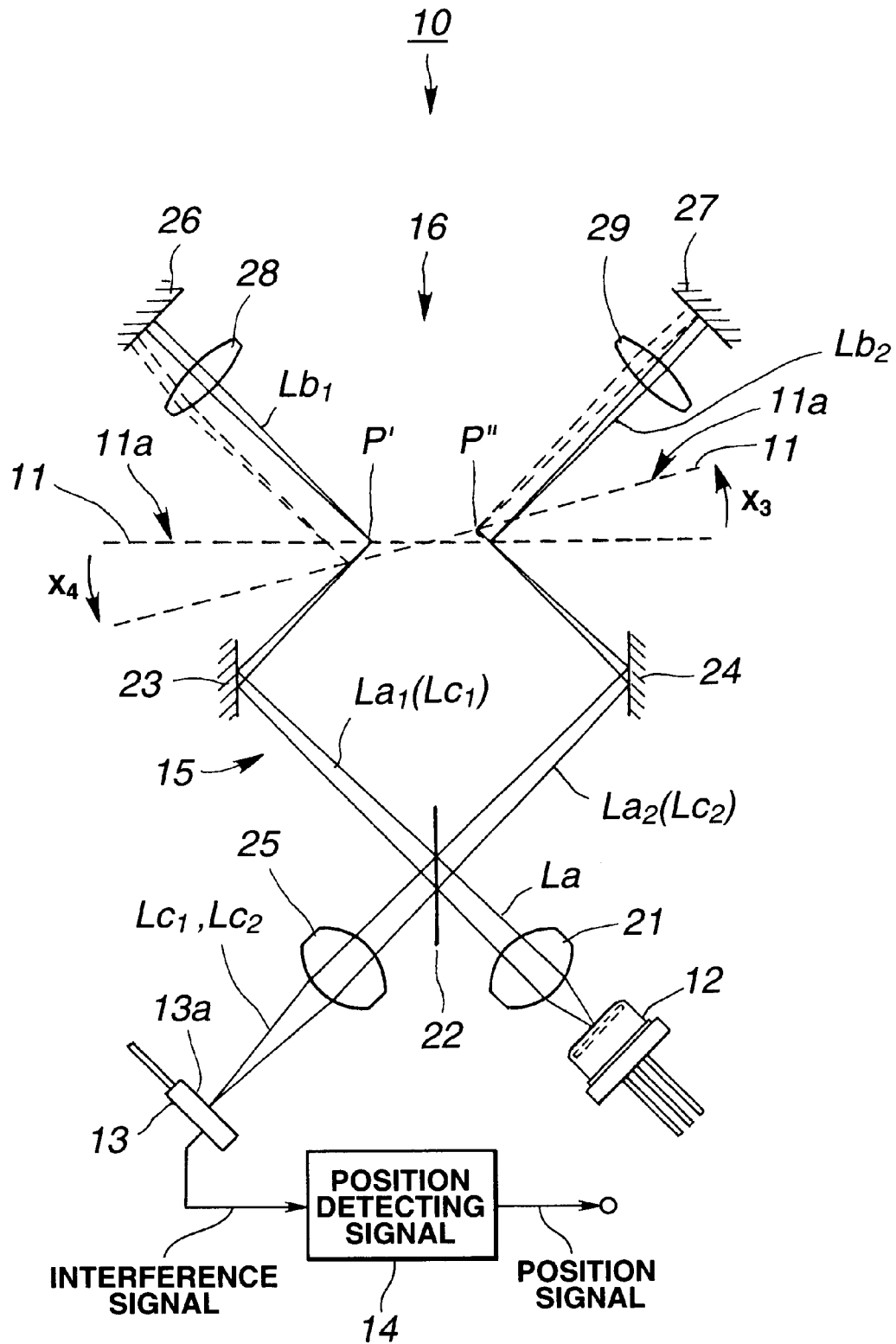
FIG. 12 is a schematic view of the first embodiment of optical displacement measurement system according to the present invention, where the two coherent beams are made to irradiate the lattice plane of the diffraction grating at respective spots that are different from each other.

Now, the optical paths of the coherent beams La1, La2, the once-diffracted beams Lb1, Lb2 and the twice-diffracted beams Lc1, Lc2 will be described by referring to FIG. 11. Note that the optical paths are only schematically illustrated in FIG. 11 and do not strictly define the optical axes of the beams.

The single coherent beam La emitted from the coherent light source Lc1, Lc2 passes through the first focussing element 21 and is split into two coherent beams La1, La2 by the half mirror 22.

One of the two coherent beams transmitted through the half mirror 22, or the coherent beam La1, is then reflected by the reflector 23 and focussed on the lattice plane 11a of the diffraction grating 11 at a predetermined spot P. Then, the coherent beam La1 focussed to the predetermined spot P is diffracted to produce a once-diffracted beam Lb1 as it is transmitted through the diffraction grating 11. Thus, the once-diffracted beam Lb1 is produced from the predetermined spot P. The produced once-diffracted beam Lb1 passes through the third focussing element 28 to become a collimated beam of light, which is then made to irradiate the reflector 26. The once-diffracted beam Lb1 striking the reflector 26 is reflected perpendicularly by the reflector 26 to pass through the third focussing element 28 once again in direction and become focussed on the lattice plane 11a of the diffraction grating 11 at the predetermined spot P. The once-diffracted beam Lb1 focussed to the predetermined spot P is diffracted to produce a twice-diffracted beam Lc1 as it is transmitted through the diffraction grating 11. The produced twice-diffracted beam Lc1 reversely follows the optical path of the coherent beam La1 to strike the half mirror 22.

On the other hand, the other coherent beam that is reflected by the half mirror 22, or the coherent beam La2, is then reflected by the reflector 24 and focussed on the lattice plane 11a of the diffraction grating 11 also at the predetermined spot P. Then, the coherent beam La1 focussed to the predetermined spot P is diffracted to produce a once-diffracted beam Lb2 as it is transmitted through the diffraction grating 11. Thus, the once-diffracted beam Lb1 is produced from the predetermined spot P. The produced once-diffracted beam Lb2 passes through the fourth focussing element 29 to become a collimated beam of fight, which is then made to irradiate the reflector 27. The once-diffracted beam Lb2 striking the reflector 27 is reflected perpendicularly by the reflector 27 to pass through the fourth focussing element 29 once again in the reverse direction and become focussed on the lattice plane 11a of the diffraction grating 11 at the predetermined spot P. The once-diffracted beam Lb2 focussed to the predetermined spot P is diffracted to produce a twice-diffracted beam Lc2 as it is transmitted through the diffraction grating 11. The produced twice-diffracted beam Lc2 reversely follows the optical path of the coherent beam La2 to strike the half mirror 22.

The twice-diffracted beam Lc1 striking the half mirror 22 is reflected by the half mirror 22. The twice-diffracted beam Lc2 entering the half mirror 22 is transmitted through the half mirror 22. The two twice-diffracted beams Lc1, Lc2 are then caused to overlap and interfere with each other by the half mirror 22. The two twice-diffracted beams Lc1, Lc2 that are interfering with each other are then made to pass through the second focussing element 25 and focussed on the light receiving plane 13a of the light receiving element 13.

With an optical displacement measurement system 10 having a configuration as described above, a phase difference is produced between the two twice-diffracted beams Lc1, Lc2 as the diffraction grating 11 is moved in the directions of the lattice vector with a movement of the movable part of the machine tool. Then, the optical displacement measurement system 10 causes the two twice-diffracted beams Lc1, Lc2 to interfere with each other to detect an interference signal and determines the phase difference of the two twice-diffracted beams Lc1, Lc2 from the interference signal to finally detect the displaced position of the diffraction grating 11s.

Assume here that one of the opposite ends of the diffraction grating 11 as viewed in the lattice vector directions is moved in one of the normal vector directions (e.g., the direction indicated by arrow X3 in FIG. 9) and the other end is moved in the other normal vector direction (e.g., the direction indicated by arrow X4 in FIG. 9) so that the lattice plane 11a is tilted. Then, both the angle of diffraction of the once-diffracted beam Lb1 and that of the once-diffracted beam Lb2 change. Therefore, the optical axes of the two once-diffracted beams Lb1, Lb2 are shifted to change their optical paths as indicated by dotted lines in FIG. 9.

However, with the optical displacement measurement system 10, the coherent beam La emitted from the coherent light source 12 is focussed on the lattice plane 11a of the diffraction grating 11 by the first focussing element 21 and the two once-diffracted beams Lb1, Lb2 are collimated and made to constantly irradiate the respective reflectors 26, 27 perpendicularly by the third focussing element 28 and the fourth focussing element 29 respectively. Thus, the once-diffracted beams Lb1, Lb2 reflected respectively by the reflector 26 and the reflector 27 are made to strike the lattice plane 11a of the diffraction grating once again at the same spot, reversely following the same optical paths they follow to strike the lattice plane 11a for the first time if their optical axes are shifted. Thus, with the optical displacement measurement system 10, the twice-diffracted beams Lc1, Lc2 produced respectively from the once-diffracted beams Lb1, Lb2 are always made to follow the same optical paths if the diffraction grating 11 is tilted so that the lengths of their optical paths will not be changed at all.

As a result of this, with the first embodiment of optical displacement measurement system 11 according to the present invention, the two twice-diffracted beams Lc1, Lc2 are not displaced relative to each other and exactly overlap with each other. Thus, when the diffraction grating 11 is displaced in a direction other than the directions parallel to the lattice vector, the interference signal detected by the light receiving element 13 will not be degraded even if the diffraction grating 11 is tilted or undulated. Therefore, the displaced position of the movable part of the machine tool can be detected accurately with an enhanced degree of resolution by the optical displacement measurement system 10. Additionally, an optical displacement measurement system 10 according to the invention can be fitted to a movable part of a machine tool with a wide choice of location and the position of the movable part can be detected reliably if the movable part is vibrated or shaken.

Still additionally, since the two twice-diffracted beams Lc1, Lc2 are focussed on a same spot on the light receiving plane 13a of an optical displacement measurement system 10 according to the invention, the beams are free from vignetting and the position of the movable part can be detected reliably and accurately.

With an optical displacement measurement system 10 according to the invention, the distance between the diffraction grating 11 and the irradiation optical system 15 can be increased by enlarging the aperture of the first focussing element 21 or that of the second focussing element 25. Additionally, a small light receiving element 13 may be used in an optical displacement measurement system 10 according to the invention to allow an enhanced degree of freedom for designing the system configuration. Furthermore, in an optical displacement measurement system 10 according to the invention, both the third focussing element 28 and the fourth focussing element 29 can be made to have a large aperture to enlarge the distance between the diffraction grating 11 and the reflection optical system 16 to allow a further enhanced degree of freedom for designing the system configuration.

Still additionally, in an optical displacement measurement system 10 according to the invention, measurement errors attributable to fluctuations in the wavelength can be eliminated by making the length of the optical path of the coherent beam La1 (and that of the twice-diffracted beam Lc1) equal to the length of the optical path of the coherent beam Lb2 (and that of the twice-diffracted beam Lc2). For the purpose of adjusting these lengths of the optical paths, a coherent light source 12 that emits a coherent beam showing coherence with which the difference in the length of optical path can be detected as a change in the modulation factor of interference fringes may be used. For example, the positions of the half mirror 22 can be adjusted so as to maximize the modulation factor of interference fringes by using a multi-mode semiconductor laser with a coherence length of several hundred $\mu$m. Then, the difference among the lengths of the optical paths can be reduced to less than tens of several $\mu$m.

Note that, in the above described first embodiment of optical displacement measurement system 10 according to the invention, the coherent beam La1 and the coherent beam La2 are made to strike a same and identical spot on the lattice plane 11a of the diffraction grating 11. For example, the coherent beam La1 and the coherent beam Lb2 may be made to strike the diffraction grating 11 at spot P. However, with this first embodiment of optical displacement measurement system 10, the coherent beam La1 and the coherent beam La2 may alternatively be made to strike the lattice plane 11a of the diffraction grating 11 not at a same spot but respective spots that are different from each other. For example, the coherent beam La1 and the coherent beam La2 may be made to strike the lattice plane 11a respectively at spots P' and P" that are separated from each other by a predetermined distance in the lattice vector directions.

An optical displacemnent measurement system 10 arranged to make the coherent beam La1 and the coherent beam La2 strike the lattice plane 10 at different spots will perform substantially same as the above described embodiment.

If such is the case, beams other than the diffracted beams Lb to be made to interfere with each other such as a diffracted or reflected beam of the 0-th degree would not stray into the irradiation/reception optical system 15 nor the reflection optical system 16. Thus, this embodiment can minimize noises and the displaced position of the movable part of the machine tool can be detected accurately with an enhanced degree of resolution and precision. However, if the spots at which the coherent beam La1 and the coherent beam La2 strike the lattice plane 10a are separated by a long distance, the focussed positions on the light receiving plane 13a can be displaced slightly as the lattice plane 11a is tilted to directions X3 and X4. Therefore, it is desirable that the distance separating the spots of incidence is small.

Figure 13:
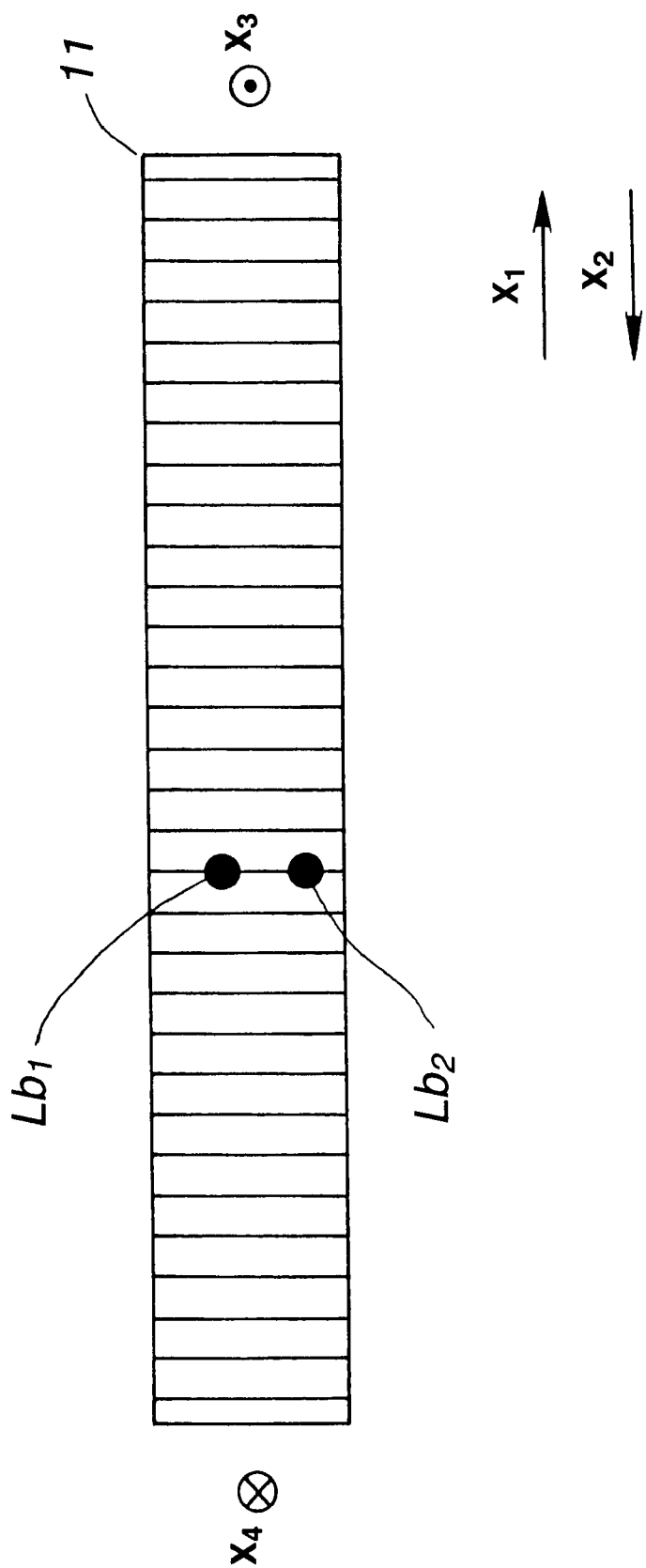
FIG. 13 is a schematic view of the diffraction grating of an optical displacement measurement system according to the invention, illustrating two spots on the diffraction grating irradiated by two coherent beams.

With the above optical displacement measurement system 10, the coherent beam La1 and the coherent beam La2 may be made to strike the lattice plane 11a of the diffraction grating 11 at respective spots that are separated by a predetermined distance either in the lattice vector directions as described above or in the lattice directions as shown in FIG. 13. In the latter case, the focussed spots of the two diffracted beams Lb1, Lb2 will not be displaced on the light receiving plane 13a of the light receiving element 13 if the diffraction grating 11 is moved in one of the normal vector directions at one of the opposite ends in a lattice vector direction (direction of X3 in FIG. 13) and in the other normal vector direction at the other end (direction of X4 in FIG. 13) to tilt the lattice plane 11a.

Now, a second embodiment of optical displacement measurement system according to the present invention and comprising a reflection type diffraction grating 11 will be described below. Note that the components of the second embodiment of optical displacement measurement system that are same as or similar to the counterparts of the above described first embodiment will be denoted respectively by the same reference symbols and will not be described any further. Also note that the components of the third and further embodiments of the invention that are same as or similar to those of the first embodiment will also be denoted respectively by the same reference symbols and will not be described any further.

Figure 14:
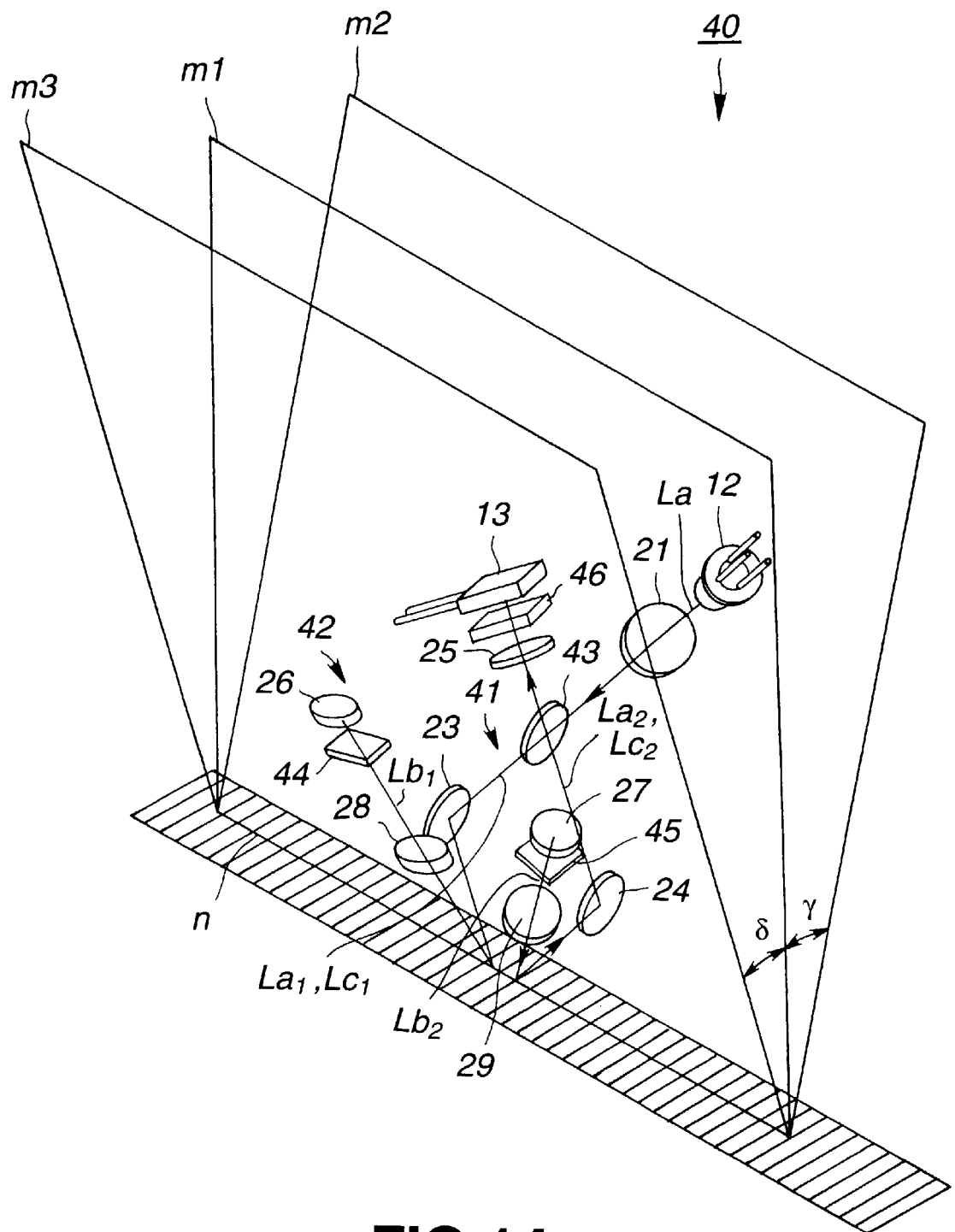
FIG. 14 is a schematic view of a second embodiment of optical displacement measurement system according to the present invention.

FIG. 14 is a schematic perspective view of the second embodiment of optical displacement measurement system.

Referring to FIG. 14, it shows an imaginary linear line n extending in parallel with the directions of the lattice vector on the lattice plane 11a of the diffraction grating 11. It also shows an imaginary plane containing the line n and extending in parallel with the normal vector. This imaginary plane is reference plane m1. There is also shown another imaginary plane containing the line n and tilted from the reference plane m1 by angle of inclination γ. This imaginary plane is referred to as inclined plane m2. There is also shown still another imaginary plane containing the line n and tilted from the reference plane m1 by angle of inclination δ. This imaginary plane is referred to as inclined plane m3. Note that both the inclined plane m2 and the inclined plane m3 are located at a same side relative to the lattice plane 11a of the diffraction grating 11.

Figure 15:
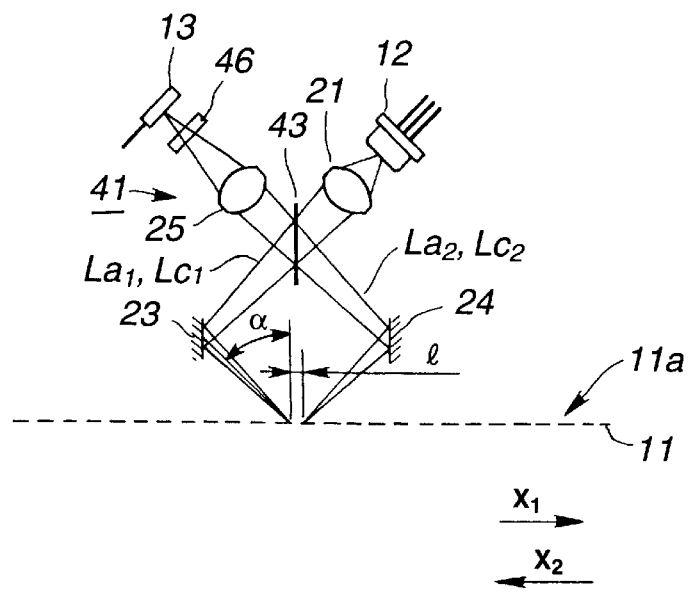
FIG. 15 is a schematic view of a component of the second embodiment of optical displacement measurement system arranged on slope m2 and viewed along a direction perpendicular relative to the slope m2.
Figure 16:
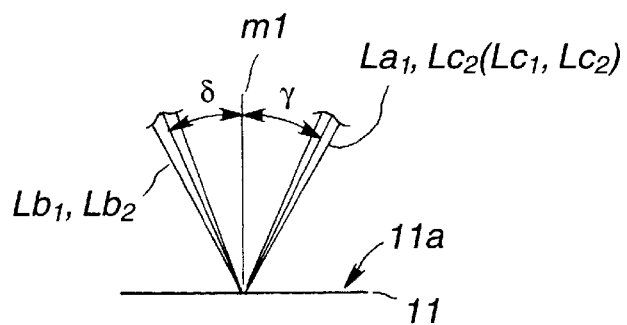
FIG. 16 is a schematic illustration of a coherent beam striking the diffraction grating and a diffracted beam diffracted by the diffraction grating of the second embodiment of optical displacement measurement system according to the present invention as viewed along the direction of the lattice vector.
Figure 17:
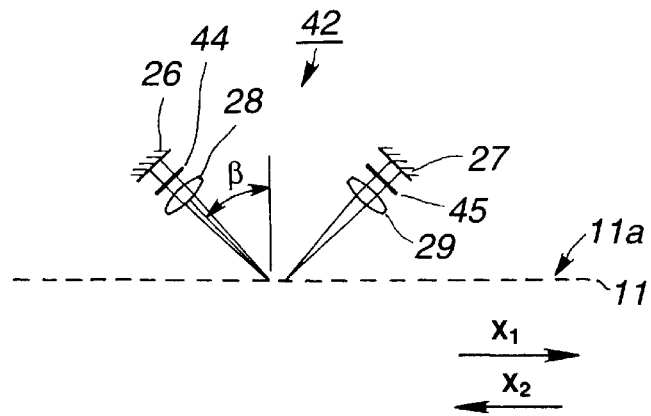
FIG. 17 is a schematic view of a component of the second embodiment of optical displacement measurement system arranged on slope m3 and viewed along a direction perpendicular relative to the slope m3.

FIG. 15 is a schematic view of the embodiment showing the components arranged on the inclined plane i112 as viewed along the direction perpendicular to the inclined plane m2. FIG. 16 is a schematic illustration of a coherent beam striking the diffraction grating 11 and a diffracted beam diffracted by the diffraction grating 11 as viewed along the direction of the lattice vector. FIG. 17 is a schematic view of the embodiment showing the components arranged on the inclined plane m3 as viewed along the direction perpendicular to the inclined plane m3.

This second embodiment of optical displacement measurement system comprises a reflection type diffraction grating 11 and adapted to detect the position of the movable part of a machine tool to which it is fitted.

As shown in FIGS. 14 and 15, the optical displacement measurement system 40 comprises a coherent light source 12 for emitting a coherent beam of light La, a light receiving element 13 for receiving two twice-diffracted beams Lc1, Lc2 that are interfering with each other and generating an interference signal and an irradiation/reception optical system 41 adapted to divide the coherent beam La into two coherent beams La1, La2 and cause them to strike the diffraction grating 11 and also the two twice-diffracted beams Lc1, Lc2 from the diffraction grating 11 to overlap with each other before irradiating the light receiving element 13.

The irradiation/reception optical system 41 comprises a first focussing element 21 for focussing the coherent beam La emitted from the coherent light source 12 on the lattice plane 11a of the diffraction grating 11, a polarized beam splitter 43 for dividing the coherent beam La emitted from the coherent light source 12 into two coherent beams La1, La2 polarized in respective directions that rectangularly intersect each other and also causing the two twice-diffracted beams Lc1, Lc2 polarized in respective directions that rectangularly intersect each other to overlap with each other, a reflector 23 for reflecting one of the coherent beams, or coherent beam La1, produced by the polarized beam splitter 43 and also the twice-diffracted beam Lc1 coining from the diffraction grating 11, another reflector 24 for reflecting the other coherent beam, or coherent beam La2, produced by the polarized beam splitter 43 and also the twice-diffracted beam Lc2, a second focussing element 25 for focussing the two twice-diffracted beams Lc1, Lc2 polarized in respective directions that rectangularly intersect each other by the polarized beam splitter 43 to overlap with each other on the light receiving plane 13a of the light receiving element 13 and a polarizing plate 46 for taking out the components showing a same direction of polarization of two twice-diffracted beams Lc1, Lc2 polarized in respective directions that rectangularly intersect each other by the polarized beam splitter 43.

The components of the irradiation/reception optical system 41 are so arranged that the optical paths of the coherent beams La (La1, La2) and those of the twice-diffracted beams Lc1, Lc2 passing therethrough are formed on the inclined plane m2. Therefore, the coherent beams La1, La2 and the twice-diffracted beams Lc1, Lc2 show an angle of incidence of $\gamma$ as viewed along the direction of the lattice vector in FIG. 16.

The coherent beam La emitted from the coherent light source 12 is made to enter the polarized beam splitter 43 with its direction of polarization inclined by 45 degrees relative to the polarized beam splitter 43 of the irradiation/reception optical system 41.

The polarized beam splitter 43 splits the incident coherent beam La into two coherent beams La1, La2 polarized in respective directions that rectangularly intersect each other. Thus, the coherent beam La1 is transmitted through the polarized beam splitter 43 of the irradiation/reception optical system 43 to become a P-polarized beam, whereas the coherent beam La2 is reflected by the polarized beam splitter 43 to become an S-polarized beam.

The polarized beam splitter 43 also receives the two twice-diffracted beams Lc1, Lc2 diffracted by the diffraction grating 11. While the twice-diffracted beam Lc1 is originally a P-polarized beam, it becomes an S-polarized beam as its direction of polarization is rotated by 90 degrees by the reflection optical system 42 as will be described in greater detail hereinafter. Similarly, while the twice-diffracted beam Lc2 is originally an S-polarized beam, it becomes a P-polarized beam as its direction of polarization is rotated by 90 degrees by the reflection optical system 42 as will be described in greater detail hereinafter. Thus, the polarized beam splitter 43 reflects the twice-diffracted beam Lc1 that is an S-polarized beam and transmits the twice-diffracted beam Lc2 that is a P-polarized beam and causes the two twice-diffracted beams Lc1, Lc2 to overlap with each other.

The reflector 23 reflects the coherent beam La1 transmitted through the polarized beam splitter 43 and makes it strike the lattice plane 11a of the diffraction grating 11 at a predetermined spot. The reflection 23 also reflects the twice-diffracted beam Lc1 coming from the diffraction grating 11 and makes it strike the polarized beam splitter 43.

The reflector 24, on the other hand, reflects the coherent beam La2 reflected by the polarized beam splitter 43 and makes it strike the lattice plane 11a of the diffraction grating 11 at the predetermined spot. The reflection 24 also reflects the twice-diffracted beam Lc2 coining from the diffraction grating 11 and makes it strike the polarized beam splitter 43.

The reflector 23 and the reflector 24 make the respective coherent beams La1 and La2 strike predetermined respective spots on the lattice plane 11a in such a way that they show an angle of incidence of $\alpha$ on the inclined plane m2. Note that the reflector 23 and the reflector 24 are arranged with their reflecting planes facing each other. Therefore, the coherent beam L1a and the coherent beam La2 are directed oppositely in terms of the lattice vector direction when striking the lattice plane 11a. Additionally, the reflector 23 and the reflector 24 cause the coherent beam La1 and the coherent beam La2 to strike the lattice plane 11a at respective spots that are separated from each other by a predetermined distance in the lattice vector direction. The distance between the spot at which the coherent beam La1 enters the lattice plane 11a and the spot at which the coherent beam La2 enters the lattice plane 11a is 1 as shown in FIG. 15.

The polarizing plate 46 transmits the twice-diffracted beam Lc1 that is an S-polarized beam and also the twice-diffracted beam Lb2 that is a P-polarized as they are made to overlap with each other by the polarized beam splitter 43. The polarizing plate 46 transmits the components of the twice-diffracted beams Lc1, Lc2 showing respective directions of polarization of 45 degrees so as to make them show a same direction of polarization.

The light receiving element 13 receives the two twice-diffracted beams Lc1, Lc2 transmitted through the polarizing plate 46.

With the optical displacement measurement system 40, the coherent beam La1 is diffracted as it enters the diffraction grating 11 and a once-diffracted beam Lb1 is produced as the coherent beam La1 is diffracted. Similarly, the coherent beam La2 is diffracted as it enters the diffraction grating 11 and a once-diffracted beam Lb2 is produced as the coherent beam La2 is diffracted. Both the once-diffracted beam Lb1 and the once-diffracted beam Lb2 show an angle of diffraction of $\delta$ as viewed along the direction of the lattice vector as shown in FIG. 16. In other words, both the once-diffracted beam Lb1 and the once-diffracted beam Lb2 are produced along the inclined plane m3. Both the once-diffracted beam Lb1 and the once-diffracted beam Lb2 show an angle of diffraction of $\beta$ on the inclined plane m3. Note that the once-diffracted beam Lb1 and the once-diffracted beam Lb2 leave the diffraction grating 11 in opposite directions as viewed along the lattice vector directions.

As shown in FIGS. 14 and 17, the optical displacement measurement system 40 comprises a reflection optical system 42.

The reflection optical system 42 comprises a reflector 26 for reflecting the once-diffracted beam Lb1 produced from the coherent beam La1 to make it strike the diffraction grating 11 once again, another reflector 27 for reflecting the once-diffracted beam Lb2 produced from the coherent beam La2 to make it strike the diffraction grating 11 once again, a third focussing element 28 for collimating the once-diffracted beam Lb1 produced from the coherent beam La1 to make it strike the reflector 26, a fourth focussing element 29 for collimating the once-diffracted beam Lb2 produced from the coherent beam La2 to make it strike the reflector 27, a ¼ wave plate 44 arranged on the optical path of the once-diffracted beam Lb1 and another ¼ wave plate 45 arranged on the optical path of the once-diffracted beam Lb2.

Since the two once-diffracted beams Lc1, Lc2 show an angle of diffraction of δ as viewed along the lattice vector directions in the reflection optical system 42 as described above, the components of the reflection optical system 42 are so arranged that the optical paths of the once-diffracted beams Lb1, Lb2 passing therethrough are formed on the inclined plane m3. Additionally, the reflector 26 and the reflector 27 of the reflection optical system 42 are arranged at respective positions where they can perpendicularly reflect the respective once-diffracted beams Lb1, Lb2 that are diffracted by an angle of diffraction of β of the inclined plane m3.

The ¼ wave plate 44 is arranged with its optical axis inclined by 45 degrees relative to the direction of polarization of the once-diffracted beam Lb1 that is a P-polarized beam coming from the diffraction grating 11. The once-diffracted beam Lb1 is transmitted through the ¼ wave plate 44 twice before it is focussed on the diffraction grating 11. Therefore, the once-diffracted beam Lb1 that is originally a P-polarized is turned into an S-polarized beam before it is made to strike the diffraction grating 11.

The ¼ wave plate 45 is arranged with its optical axis inclined by 45 degrees relative to the direction of polarization of the once-diffracted beam Lb2 that is an S-polarized beam coming from the diffraction grating 11. The once-diffracted beam Lb2 is transmitted through the ¼ wave plate 45 twice before it is focussed on the diffraction grating 11. Therefore, the once-diffracted beam Lb2 that is originally an S-polarized beam is turned into a P-polarized beam before it is made to strike the diffraction grating 11.

The two once-diffracted beams Lb1, Lb2 are made to strike the diffraction grating 11 from the reflection optical system 42 having a configuration as described above. The angles of incidence of the once-diffracted beams Lb1, Lb2 is equal to the angle of diffraction δ of the once-diffracted beams Lb1, Lb2 as viewed along the lattice vector. Additionally, the angle of incidence of the once-diffracted beams Lb1, Lb2 on the inclined plane m3 is equal to their angle of diffraction β.

The twice-diffracted beams Lc1, Lc2 are produced as the once-diffracted beams Lb1, Lb2 are diffracted. The angle of diffraction of the twice-diffracted beams Lc1, Lc2 as viewed along the lattice vector directions is equal to the angle of incidence γ of the coherent beams La1, La2. Additionally, the angle of incidence of the once-diffracted beams Lb1, Lb2 on the inclined plane m2 is equal to the angle of incidence α of the coherent beams La1, La2.

Thus, the twice-diffracted beams Lc1, Lc2 respectively follows the optical paths of the coherent beams La1, La2 reversely and strike the polarized beam splitter 43.

The optical displacement measurement system 40 additionally comprises a position detecting section (not shown) adapted to detect the displaced position of the diffraction grating 11 on the basis of the interference signal from the light receiving element 13.

With an optical displacement measurement system 40 having a configuration as described above, a phase difference is produced between the two twice-diffracted beams Lc1, Lc2 as the diffraction grating 11 is moved in the directions of the lattice vector as a result of a movement of the movable part of the machine tool. Then, the optical displacement measurement system 40 causes the two twice-diffracted beams Lc1, Lc2 to interfere with each other to detect an interference signal and determines the phase difference of the two twice-diffracted beams Lc1, Lc2 from the interference signal to finally detect the displaced position of the diffraction grating 11.

With the above described optical displacement measurement system 40, the optical paths of coherent beams and those of diffracted beams can be separated from each other by arranging an irradiation/reception optical system 41 on inclined plane m2 showing a predetermined angle of inclination relative to reference plane m1 and a reflection optical system 42 on inclined plane m3 to allow an enhanced degree of freedom for designing the system configuration. Additionally, the diffracted beams Lb1, Lb2 can be made to interfere with each other without allowing any diffracted beams of the 0-th degree or reflected beams to stray into the irradiation/reception optical system 41 or the light receiving optical system 42. Thus, the displaced position of the movable part of the machine tool can be detected accurately with an enhanced degree of resolution.

The requirements to be met to eliminate any diffracted beams of the 0-th degree or reflected beams trying to stray into the irradiation/reception optical system 41 or the reflection optical system 42 of the optical displacement measurement system 40 are as follows.

If the angles γ and δ are not equal to 0 and the angles α and β are equal with each other, the coherent beam La1 and the coherent beam La2 are made to strike the diffraction grating 11 at respective spots separated by distance 1 that would not allow any diffracted beams of the 0-th degree to irradiate the light receiving element 13. While the coherent beam La1 and the coherent beam La2 may be made to strike the diffraction grating 11 at respective spots separated along the lattice vector direction, they may alternatively be made to strike the diffraction grating 11 at respective spots separated by a predetermined distance along the lattice direction as shown in FIG. 13.

If the both angles γ and δ are equal to 0, the angles α and β should be made different from each other because the optical paths will lie one on the other if the angles α and β are equal with each other. In this case, the coherent beam La1 and the coherent beam La2 are made to strike the diffraction grating 11 at respective spots separated by a distance 1 that can ensure that no diffracted beam of the 0-th order enters the light receiving element 13. The coherent beam La1 and the coherent beam La2 may be separated along the lattice vector directions or along the lattice directions as illustrated in FIG. 13.

Figure 18:
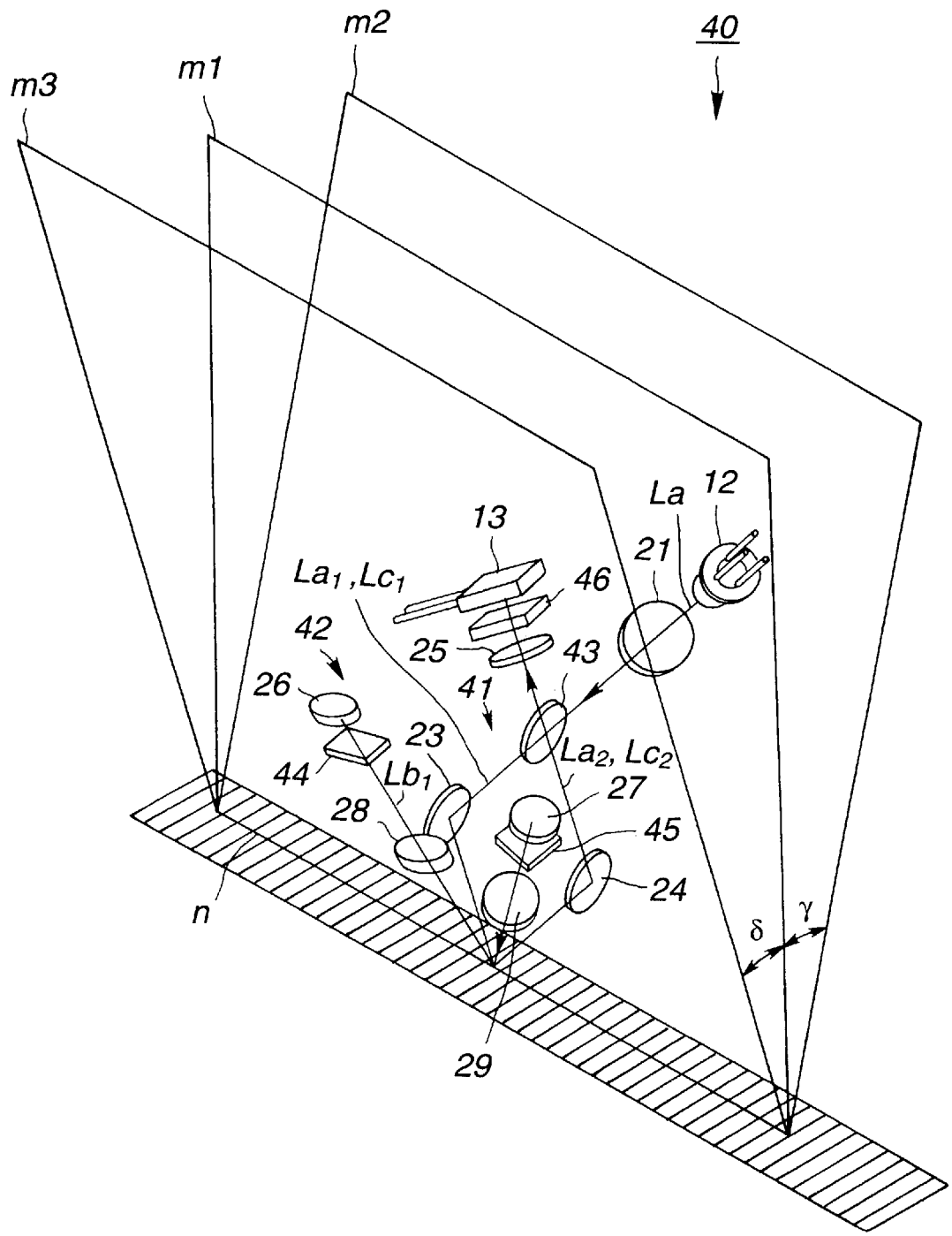
FIG. 18 is a schematic view of the second embodiment of optical displacement measurement system according to the present invention, where the two coherent beams are made to irradiate the lattice plane of the diffraction grating at respective spots that are different from each other.
Figure 19:
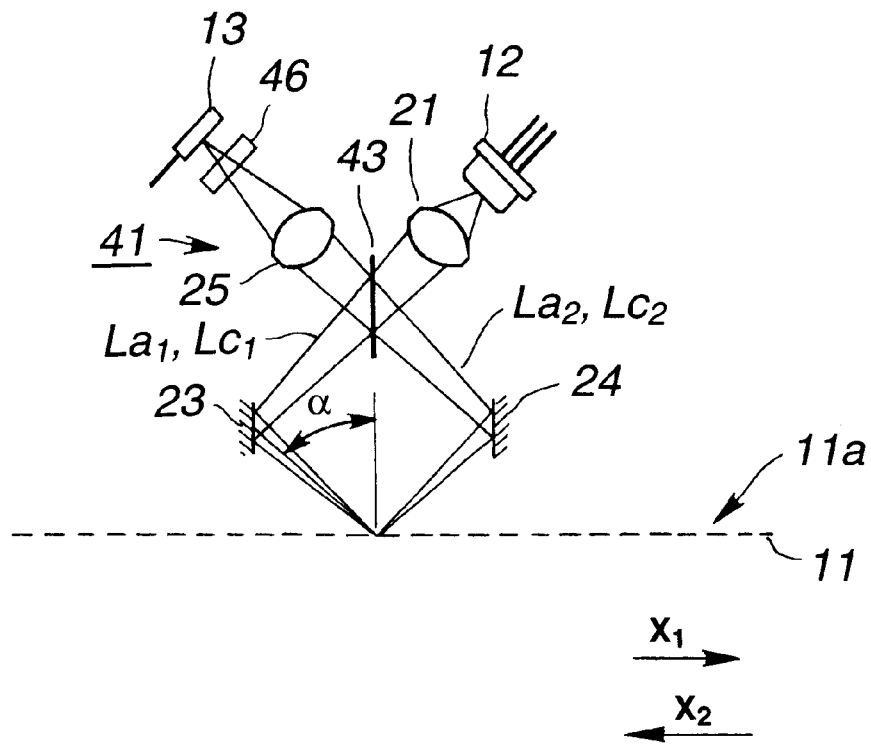
FIG. 19 is a schematic view of a component of the second embodiment of optical displacement measurement system arranged on slope m2 and viewed along a direction perpendicular relative to the slope m2, the two coherent beams being made to irradiate the lattice plane of the diffraction grating at respective spots that are different from each other.
Figure 20:
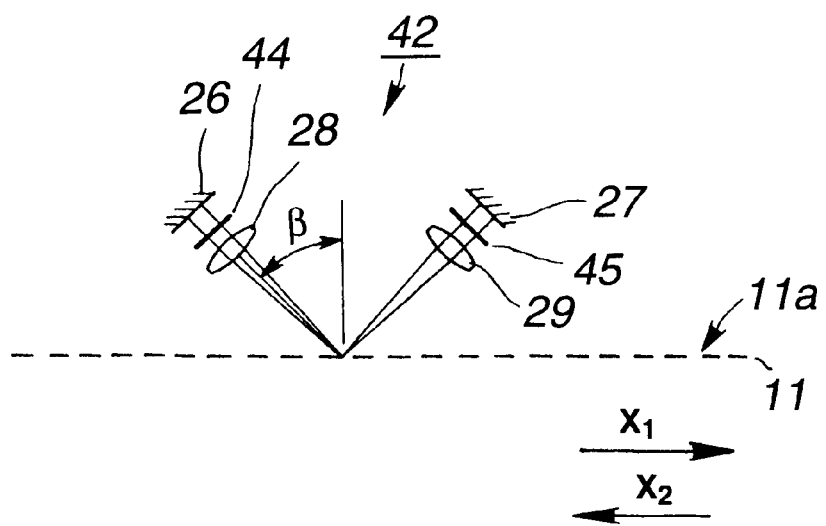
FIG. 20 is a schematic view of a component of the second embodiment of optical displacement measurement system arranged on slope m3 and viewed along a direction perpendicular relative to the slope m3, the two coherent beams being made to irradiate the lattice plane of the diffraction grating at respective spots that are different from each other.

If the angles γ and δ are not equal to 0 and the angles α and β are differentiated from each other to an extent that ensures that no diffracted beam of 0-th order enters the light receiving element 13, the spot at which the coherent beam La1 strikes the diffraction grating 11 may be made same as the spot at which the coherent beam La2 strikes the diffraction grating 11 as illustrated in FIGS. 18, 19 and 20. In this case, the influence of both the varying thickness and the varying refractive index, if any, can be reduced if compared with the case where the spot at which the coherent beam La1 strikes the diffraction grating 11 and the spot at which the coherent beam La2 strikes the diffraction grating 11 are separated by a predetermined distance. Thus, the lengths of the optical paths of the once-diffracted beam Lb1 and the once-diffracted beam Lb2 (or of the twice-diffracted beam Lc1 and the twice-diffracted beam Lc2 do not show any difference so that the displaced position of the movable part can be determined highly accurately.

Now, the influence of possible variations in the thickness of the diffraction grating 11 will be discussed below.

Assume that the two twice-diffracted beam Lc1, Lc2 to be made to overlap with each other have respective intensities of A1, A2 and the displacement of the diffraction grating 11 in the lattice vector direction is x, while the initial phase is δ, then the intensity I of the interference signal detected by the light receiving element 13 will be expressed by formula (1) below:

$$I = A_1^2 + A_2^2 + 2A_1 A_2 \cos(4Kx + \delta) \tag{1}$$

where $K = 2\pi/\Lambda$ ($\Lambda$ being the lattice pitch).

The intensity I is transformed for every cycle period as the diffraction grating 11 is moved by $\Lambda/4$. δ represents a quantity that varies depending on the difference of the lengths of the optical paths of the twice-diffracted beams Lc1, Lc2 that are made to overlap with each other. Therefore, if δ varies, the intensity I of the interference signal changes to give rise to an error if the diffraction grating 11 is not shifted.

Figure 21:
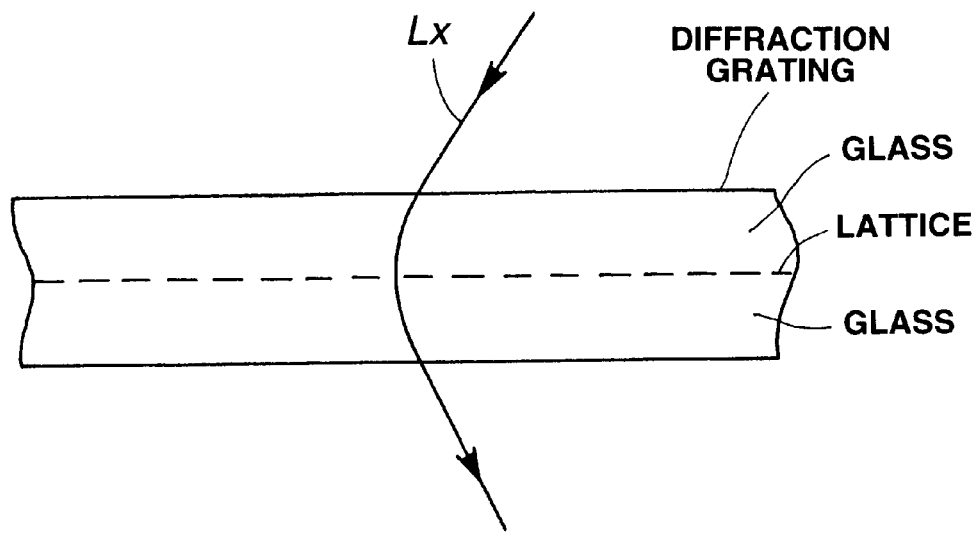
FIG. 21 is a schematic illustration of the length of the optical path of a laser beam passing through a diffraction grating.

Assume, for example, that the transmission type diffraction grating containing a latticework formed inside a piece of glass as shown in FIG. 21 has a thickness that fluctuates. If the refractive index of the glass is n and the distance by which laser beam Lx travels to cross the piece of glass from a surface to the opposite surface thereof is L, then the length of the optical path of the laser beam Lx will be nL when it passes through the diffraction grating. Since the refractive index of air is substantially equal to 1, the length of the light path of the laser beam Lx when passing through the diffraction grating will be longer than that of the laser beam Lx traveling through air by $(n-1)\Delta L$. Thus, if the thickness of the piece of glass of the diffraction grating fluctuates to change the distance by which the laser beam Lx travels to cross the piece of glass from a surface to the opposite surface thereof to $L+\Delta L$, then the length of the light path of the laser beam is changed by $2(n-1)\Delta L$.

Figure 22:
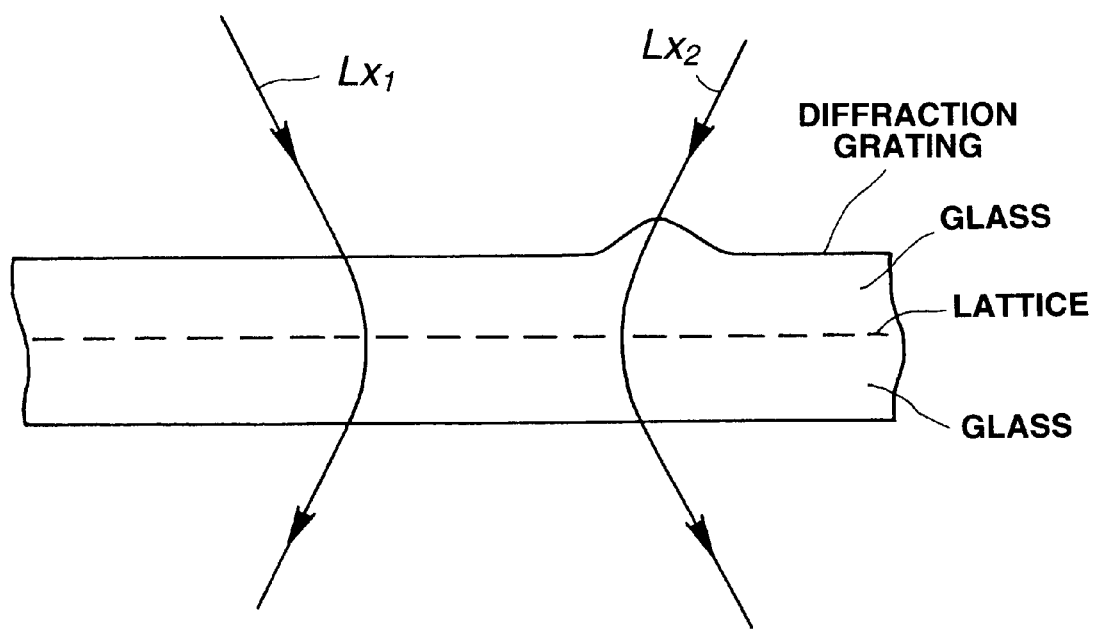
FIG. 22 is a schematic illustration of the difference between the optical paths of two laser beams passing through a diffraction grating when the latter has a varying thickness.

Keeping this in in mind and referring to FIG. 22, imagine a pair of laser beams Lx1 and Lx2, of which the laser beam Lx1 passes through a diffraction grating at a position free from fluctuations in the thickness whereas the laser beam Lx2 passes through the diffraction grating at a position where the thickness fluctuates. If the laser beam Lx2 travels through the diffraction grating longer than the laser beam Lx1 by a distance $+\Delta L$, then the difference between the lengths of the optical paths of the two laser beams Lx1, Lx2 is $(n-1)\Delta L$. Therefore, the value of δ formula (1) above is varied by $\{(n-1)\Delta L\} \cdot 2\pi/\lambda$ (where λ represents the wavelength of beams A and B) to give rise to an error in the interference signal. In the case of twice-diffracted beams, δ will be equal to $(\Lambda/2\lambda)(n-1)\Delta L$. If $\Lambda=0.55$ μm and $\lambda=0.78$ μm while n=1.5 and $\Delta L=1$ μm, the variation in the value of δ will be about 0.18 μm, which is substantially large when the position of the movable part is to be detected to a degree of accuracy of nanometers.

While the influence of possible variations in the thickness of a transmission type diffraction grating 11 is discussed above, a similar error occurs in the case of a reflection type diffraction grating if the diffraction grating is covered by glass. If the diffraction grating is not covered by glass, the difference in the distances travelled by the laser beams due to the undulations is directly reflected to the difference in the distances of the optical paths.

Thus, if the diffraction grating 11 shows fluctuations in the thickness, errors can occur when the spots at which the coherent beam La1 and the coherent beam La2 respectively enter the diffraction grating 11 are separated by a predetermined distance.

Errors attributable to the fluctuations in the thickness and the refractive index of the diffraction grating 11 can be minimized to make the optical displacement measurement system capable of detecting the position of the movable part highly accurately by arranging the irradiation optical system 41 on an inclined plane m2 tilted by a predetermined angle of inclination relative to reference plane m1 while arranging the light receiving optical system 42 on an inclined plane m3 and causing both the coherent beam La1 and the coherent beam La2 to enter the diffraction grating 11 at a same and identical spot. In other words, errors attributable to fluctuations in the thickness and/or the refractive index of the diffraction grating 11 can occur when the coherent beam La1 and the coherent beam La2 enter the diffraction grating 11 at respective spots that are different from each other and, therefore, the position of the movable part can be detected highly accurately by causing both the coherent beam La1 and the coherent beam La2 to enter the diffraction grating 11 at a same and identical spot. While it may be difficult to cause the two diffracted beams La1, La2 to exactly follow a same and identical light path when the diffraction grating 11 is covered by glass, the difference between the lengths of the two light paths can be minimized by making them enter the diffraction grating 11 at a same and identical spot.

The relationship among the angles of incidence α, γ of the coherent beams and the angle of diffraction β, δ of the once-diffracted beams is expressed by formulas (2) and (3) below.

$$\sin\alpha + \sin\beta = m\lambda/d \tag{2}$$

where
d: pitch of diffraction grating,
λ: wavelength of light
m: degree of diffraction $$\sin\gamma/\sin\delta = \cos\beta/\cos\alpha \tag{3}$$

Thus, if $\alpha=\beta$, $\gamma=\delta$, whereas, if $\alpha\neq\beta$, $\gamma\neq\delta$.

Figure 23:
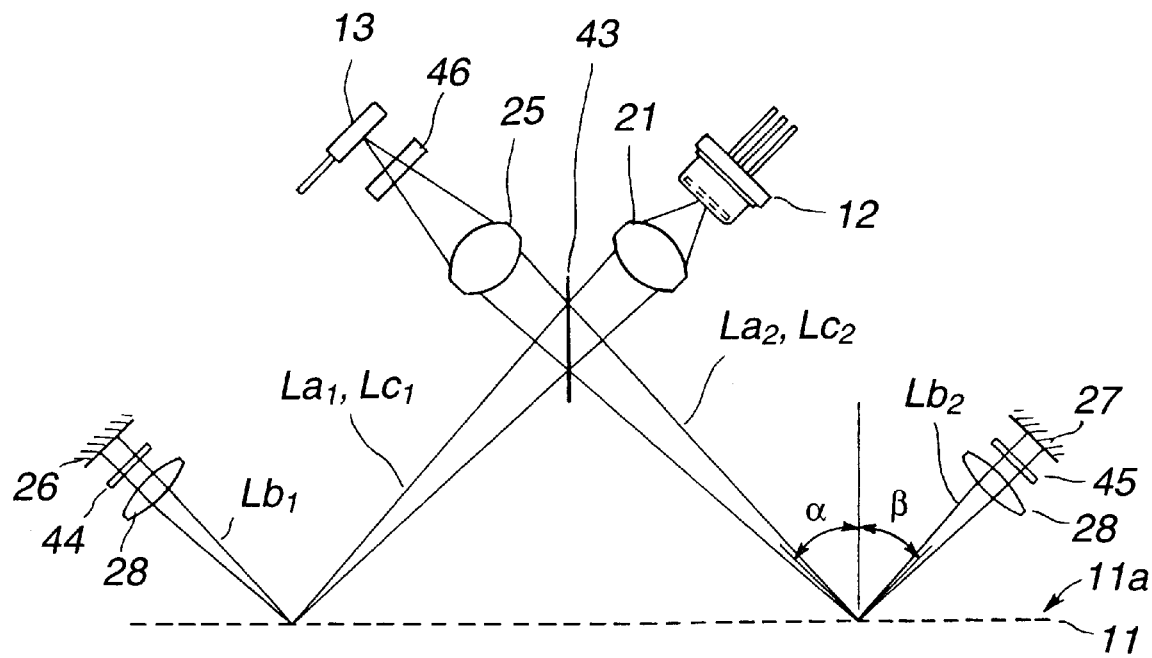
FIG. 23 is a schematic perspective view of an optical displacement measurement system obtained by modifying the second embodiment of the invention.

While reflectors 23, 24 are used to respectively reflect the coherent beams La1, La2 and the twice-diffracted beams Lc1, Lc2 in the above described second embodiment of optical displacement measurement system 40, the reflectors 23,24 may be omitted as shown in FIG. 23 if the coherent beams La1, La2 are not made to strike the diffraction grating at a same and identical spot.

Now, a third embodiment of optical displacement measurement system according to the present invention will be described below.

Figure 24:
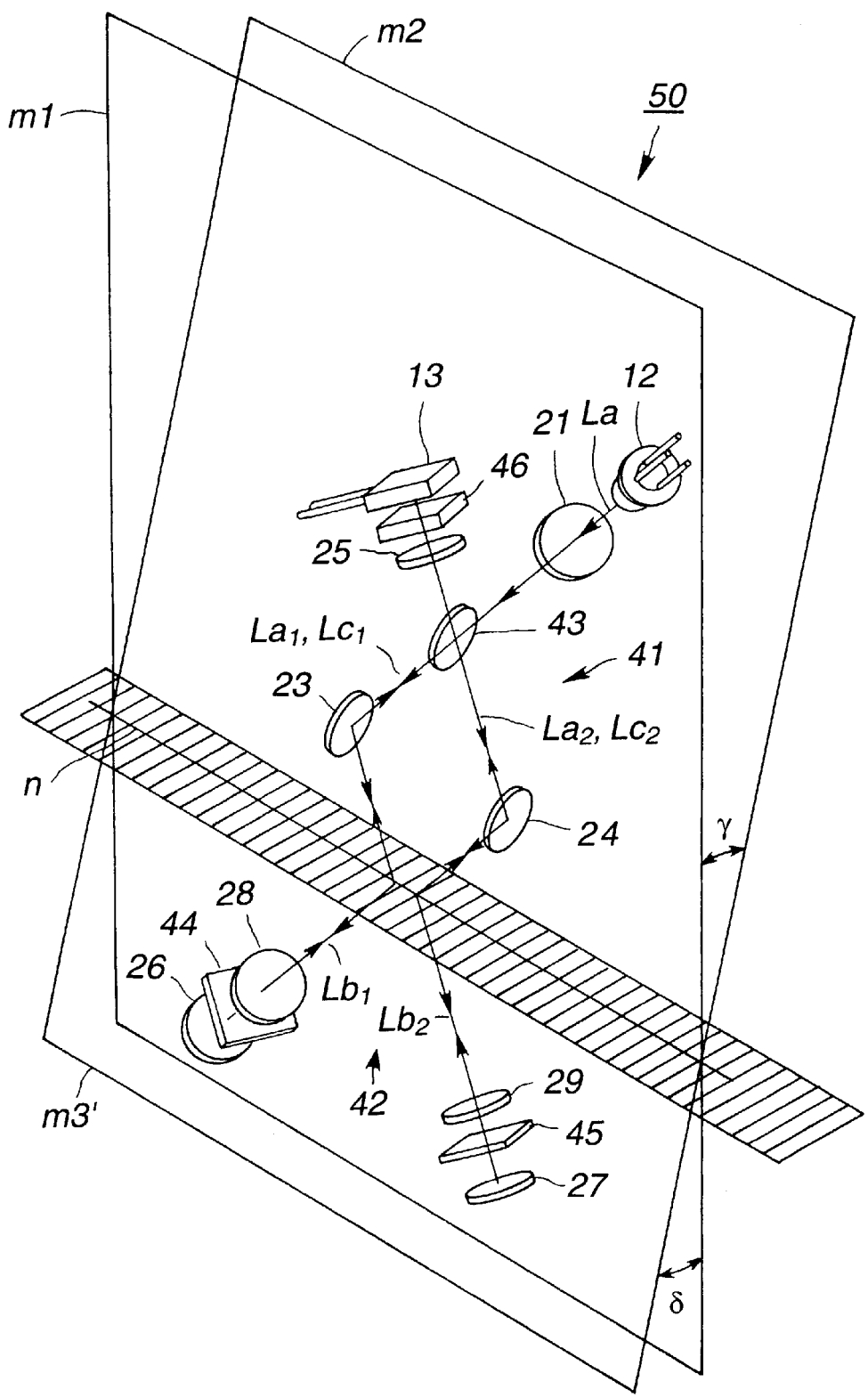
FIG. 24 is a schematic perspective view of a third embodiment of optical displacement measurement system according to the present invention.

FIG. 24 is a schematic perspective view of the third embodiment of optical displacement measurement system according to the invention.

Note that the relationship of the straight line n, the reference plane m1 and the inclined plane m2 is same as its counterpart of the above described second embodiment. There is shown an imaginary plane containing the line n and tilted from the reference plane m1 by angle of inclination δ.

This imaginary plane is referred to as inclined plane m3'. Note that both the inclined plane m2 and the inclined plane m3 are located at opposite sides relative to the lattice plane 11a of the diffraction grating 11.

Figure 25:
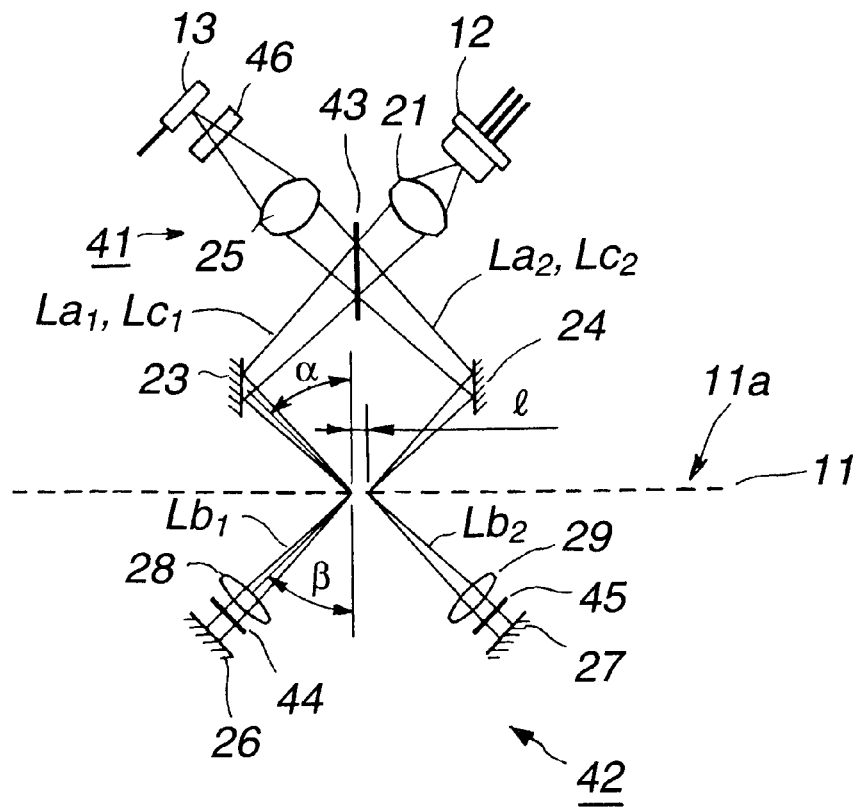
FIG. 25 is a schematic view of a components of the third embodiment of optical displacement measurement system arranged on slopes m2 and m3' and viewed along directions perpendicular relative to the slopes m2 and m3' respectively.
Figure 26:
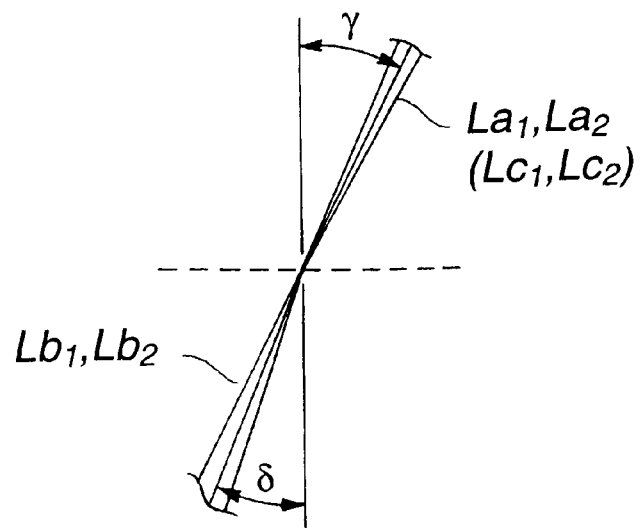
FIG. 26 is a schematic illustration of a coherent beam striking the diffraction grating and a diffracted beam diffracted by the diffraction grating of the third embodiment of optical displacement measurement system according to the present invention as viewed along the direction of the lattice vector.

FIG. 25 is a schematic view of the embodiment showing the components arranged on the inclined plane in 2 as viewed along the direction perpendicular to the inclined plane m3'. FIG. 26 is a schematic illustration of a coherent beam striking the diffraction grating 11 and a diffracted beam diffracted by the diffraction grating 11 as viewed along the direction of the lattice vector.

This third embodiment of optical displacement measurement system comprises a transmission type diffraction grating 11 and adapted to detect the position of the movable part of a machine tool to which it is fitted.

As shown in FIGS. 24 and 25, the optical displacement measurement system 50 comprises a coherent light source 12 for emitting a coherent beam of light La, a light receiving element 13 for receiving two twice-diffracted beams Lc1, Lc2 that are interfering with each other and generating an interference signal and an irradiation/reception optical system 41 adapted to divide the coherent beam La into two coherent beams La1, La2 and cause them to strike the diffraction grating 11 and also the two twice-diffracted beams Lc1, Lc2 from the diffraction grating 1I1 to overlap with each other before irradiating the light receiving element 13.

The components of the irradiation/reception optical system 41 are so arranged that the optical paths of the coherent beams La (La1, La2) and those of the twice-diffracted beams Lc1, Lc2 passing therethrough are formed on the inclined plane m2. Therefore, the coherent beams La1, La2 and the twice-diffracted beams Lc1, Lc2 show an angle of incidence of γ as viewed along the direction of the lattice vector in FIG. 26.

The reflector 23 and the reflector 24 make the respective coherent beams La1 and La2 strike predetermined respective spots on the lattice plane 11a in such a way that they show an angle of incidence of α on the inclined plane m2. Note that the reflector 23 and the reflector 24 are arranged with their reflecting planes facing each other. Therefore, the coherent beam L1a and the coherent beam La2 are directed oppositely in terms of the lattice vector direction when striking the lattice plane 11a. Additionally, the reflector 23 and the reflector 24 cause the coherent beam La1 and the coherent beam La2 to strike the lattice plane 11a at respective spots that are separated from each other by a predetermined distance in the lattice vector direction. The distance between the spot at which the coherent beam La1 enters the lattice plane 11a and the spot at which the coherent beam La2 enters the lattice plane 11a is 1 as shown in FIG. 25.

With the optical displacement measurement system 50, the coherent beam La1 is diffracted as it enters the diffraction grating 11 and a once-diffracted beam Lb1 is produced as the coherent beam La1 is diffracted. Similarly, the coherent beam La2 is diffracted as it enters the diffraction grating 11 and a once-diffracted beam Lb2 is produced as the coherent beam La2 is diffracted. Both the once-diffracted beam Lb1 and the once-diffracted beam Lb2 show an angle of diffraction of δ as viewed along the direction of the lattice vector as shown in FIG. 26. In other words, both the once-diffracted beam Lb1 and the once-diffracted beam Lb2 are produced along the inclined plane m3'. Both the once-diffracted beam Lb1 and the once-diffracted beam Lb2 show an angle of diffraction of β on the inclined plane m3'. Note that the once-diffracted beam Lb1 and the once-diffracted beam Lb2 leave the diffraction grating 11 in opposite directions as viewed along the lattice vector directions.

As shown in FIGS. 24 and 25, the optical displacement measurement system 50 comprises a reflection optical system 42.

Since the two once-diffracted beams Lc1, Lc2 show an angle of diffraction of δ as viewed along the lattice vector directions in the reflection optical system 42 as described above, the components of the reflection optical system 42 are so arranged that the optical paths of the once-diffracted beams Lb1, Lb2 passing therethrough are formed on the inclined plane m3'. Additionally, the reflector 26 and the reflector 27 of the reflection optical system 42 are arranged at respective positions where they can perpendicularly reflect the respective once-diffracted beams Lb1, Lb2 that are diffracted by an angle of diffraction of β on the inclined plane m3'.

The two once-diffracted beams Lb1, Lb2 are made to strike the diffraction grating 11 from the reflection optical system 42 having a configuration as described above. The angles of incidence of the once-diffracted beams Lb1, Lb2 is equal to the angle of diffraction δ of the once-diffracted beams Lb1, Lb2 as viewed along the lattice vector. Additionally, the angle of incidence of the once-diffracted beams Lb1, Lb2 on the inclined plane m3' is equal to their angle of diffraction β.

The twice-diffracted beams Lc1, Lc2 are produced as the once-diffracted beams Lb1, Lb2 are diffracted. The angle of diffraction of the twice-diffracted beams Lc1, Lc2 as viewed along the lattice vector directions is equal to the angle of incidence γ of the coherent beams La1, La2. Additionally, the angle of incidence of the once-diffracted beams Lb1, Lb2 on the inclined plane m2 is equal to the angle of incidence α of the coherent beams La1, La2.

Thus, the twice-diffracted beams Lc1, Lc2 respectively follows the optical paths of the coherent beams La1, La2 reversely and strike the polarized beam splitter 43.

The optical displacement measurement system 50 additionally comprises a position detecting section (not shown) adapted to detect the displaced position of the diffraction grating 11 on the basis of the interference signal from the light receiving element 13.

With an optical displacement measurement system 50 having a configuration as described above, a phase difference is produced between the two twice-diffracted beams Lc1, Lc2 as the diffraction grating 11 is moved in the directions of the lattice vector as a result of a movement of the movable part of the machine tool. Then, the optical displacement measurement system 50 causes the two twice-diffracted beams Lc1, Lc2 to interfere with each other to detect an interference signal and determines the phase difference of the two twice-diffracted beams Lc1, Lc2 from the interference signal to finally detect the displaced position of the diffraction grating 11.

With the above described optical displacement measurement system 50, the optical paths of coherent beams, those of once-diffracted beams and those of twice-diffracted beams can be separated from each other by arranging an irradiation/reception optical system 41 on inclined plane i2 showing a predetermined angle of inclination relative to reference plane m1 and a reflection optical system 42 on inclined plane m3' to allow an enhanced degree of freedom for designing the system configuration. Additionally, the diffracted beams Lb1, Lb2 can be made to interfere with each other without allowing any diffracted beams of the 0-th degree or reflected beams to stray into the irradiation/reception optical system 41 or the light receiving optical system 42. Thus, the displaced position of the movable part of the machine tool can be detected accurately with an enhanced degree of resolution.

The requirements to be met to eliminate any diffracted beams of the 0-th degree or reflected beams trying to stray into the irradiation/reception optical system 41 or the reflection optical system 42 of the optical displacement measurement system 50 are as follows.

If the angles γ and δ are not equal to 0 and the angles α and β are equal with each other, the coherent beam La1 and the coherent beam La2 are made to strike the diffraction grating 11 at respective spots separated by distance 1 that would not allow any diffracted beams of the 0-th degree to irradiate the light receiving element 13. While the coherent beam La1 and the coherent beam La2 may be made to strike the diffraction grating 11 at respective spots separated along the lattice vector direction, they may alternatively be made to strike the diffraction grating 11 at respective spots separated by a predetermined distance along the lattice direction as shown in FIG. 13.

If both the angles γ and δ are equal to 0, the angles α and β may or may not be equal to each other. The coherent beam La1 and the coherent beam La2 are made to strike the diffraction grating 11 at respective spots separated by a distance 1 that can ensure that no diffracted beam of the 0-th order enters the light receiving element 13 regardless if α=β or α≠β. The coherent beam La1 and the coherent beam La2 may be separated along the lattice vector directions or along the lattice directions as illustrated in FIG. 13.

If the angles γ and δ are not equal to 0 and the angles α and β are differentiated from each other to an extent that ensures that no diffracted beam of 0-th order enters the light receiving element 13, the spot at which the coherent beam La1 strikes the diffraction grating 11 may be made same as the spot at which the coherent beam La2 strikes the diffraction grating 11.

Figure 27:
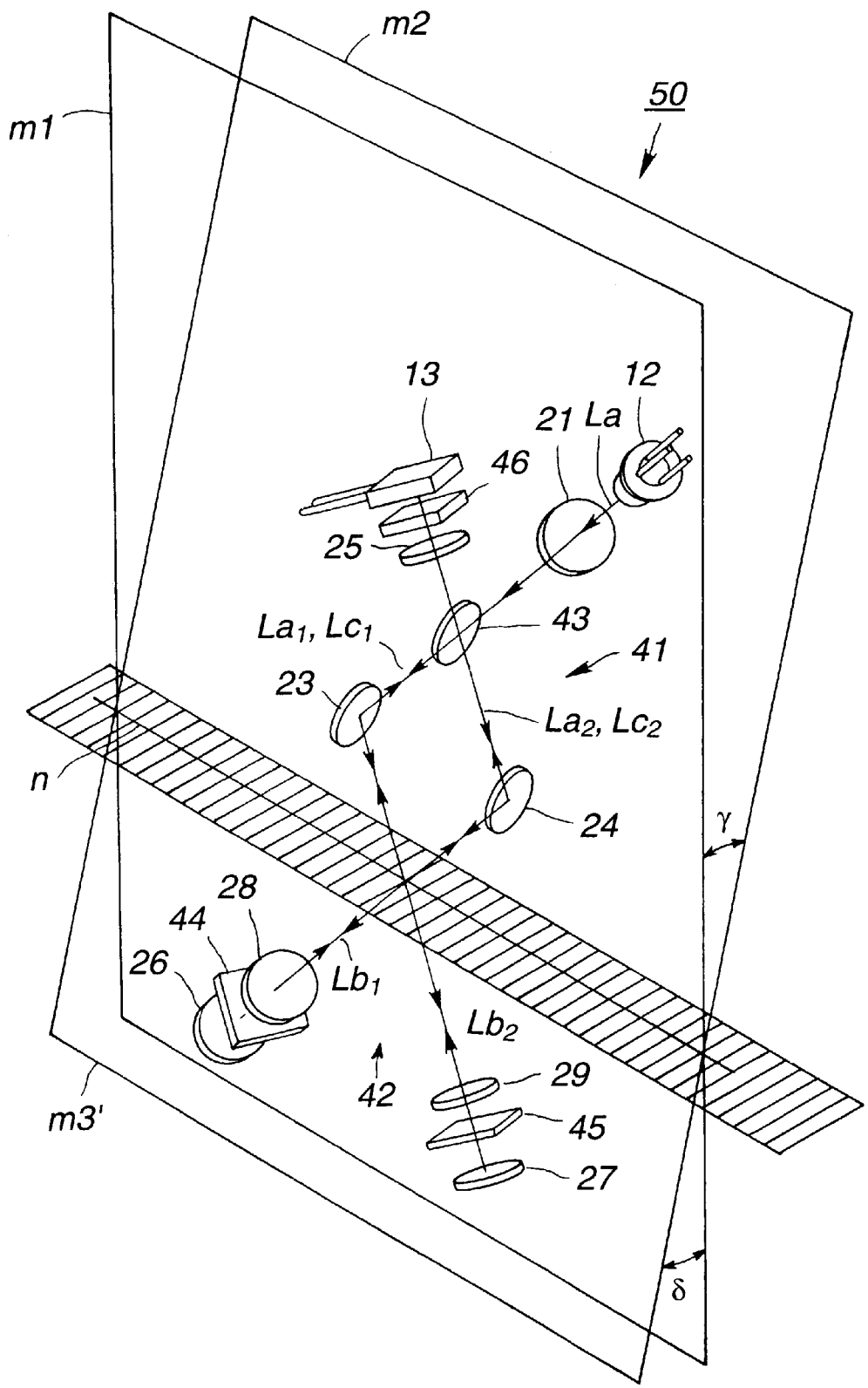
FIG. 27 is a schematic view of the third embodiment of optical displacement measurement system according to the present invention, where the two coherent beams are made to irradiate the lattice plane of the diffraction grating at respective spots that are different from each other.
Figure 28:
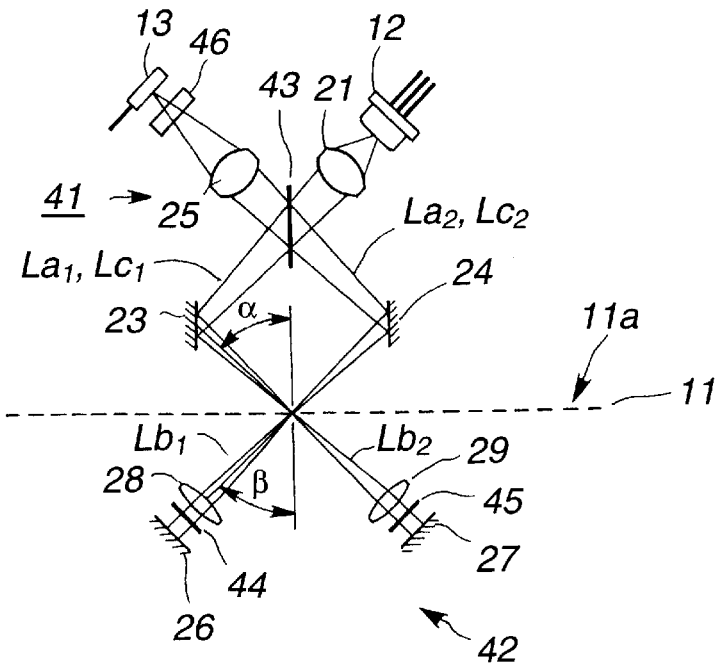
FIG. 28 is a schematic view of a components of the third embodiment of optical displacement measurement system arranged on slopes m2 and m3' and viewed along directions perpendicular relative to the slopes m2 and m3' respectively, the two coherent beams being made to irradiate the lattice plane of the diffraction grating at respective spots that are different from each other.

If the angles γ and δ are not equal to 0 and the angles α and β are differentiated from each other to an extent that ensures that no diffracted beam of 0-th order enters the light receiving element 13, the spot at which the coherent beam La1 strikes the diffraction grating 11 may be made same as the spot at which the coherent beam La2 strikes the diffraction grating 11 as illustrated in FIGS. 27 and 28. In this case, the influence of both the varying thickness and the varying refractive index, if any, can be reduced if compared with the case where the spot at which the coherent beam La1 strikes the diffraction grating 11 and the spot at which the coherent beam La2 strikes the diffraction grating 11 are separated by a predetermined distance. Thus, the lengths of the optical paths of the once-diffracted beam Lb1 and the once-diffracted beam Lb2 (or of the twice-diffracted beam Lc1 and the twice-diffracted beam Lc2) do not show any difference so that the displaced position of the movable part can be determined highly accurately.

Figure 29:
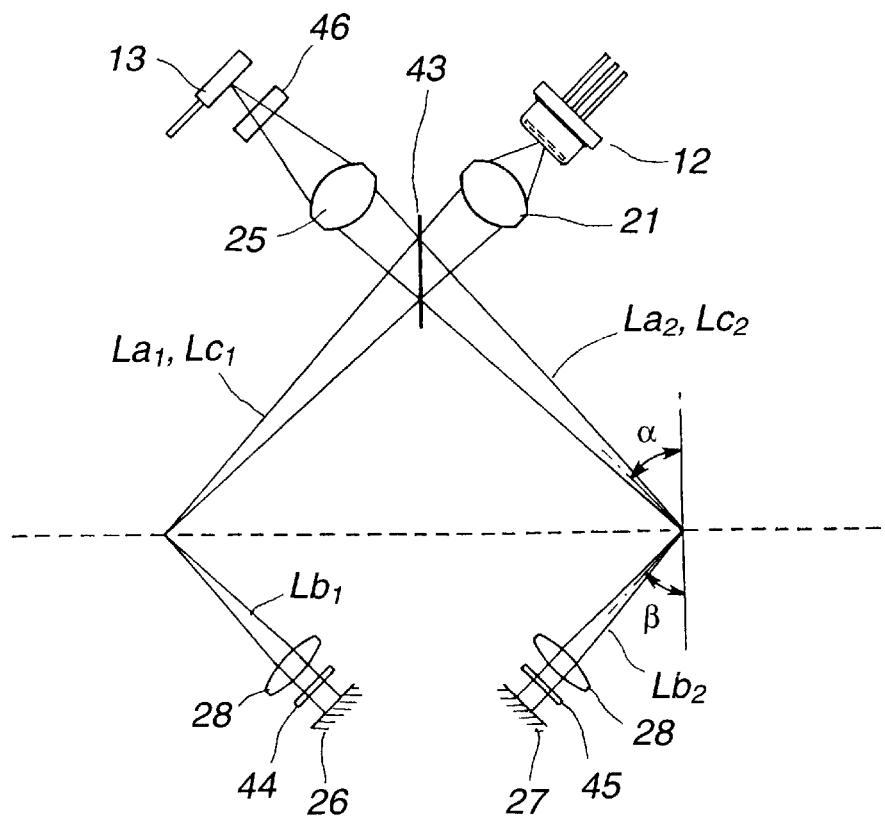
FIG. 29 is a schematic perspective view of an optical displacement measurement system obtained by modifying the third embodiment of the invention.

While reflectors 23, 24 are used to respectively reflect the coherent beams La1, La2 and the twice-diffracted beams Lc1, Lc2 in the above described third embodiment of optical displacement measurement system 50, the reflectors 23, 24 may be omitted as shown in FIG. 29 if the coherent beams La1, La2 are not made to strike the diffraction grating at a same and identical spot.

Figure 30:
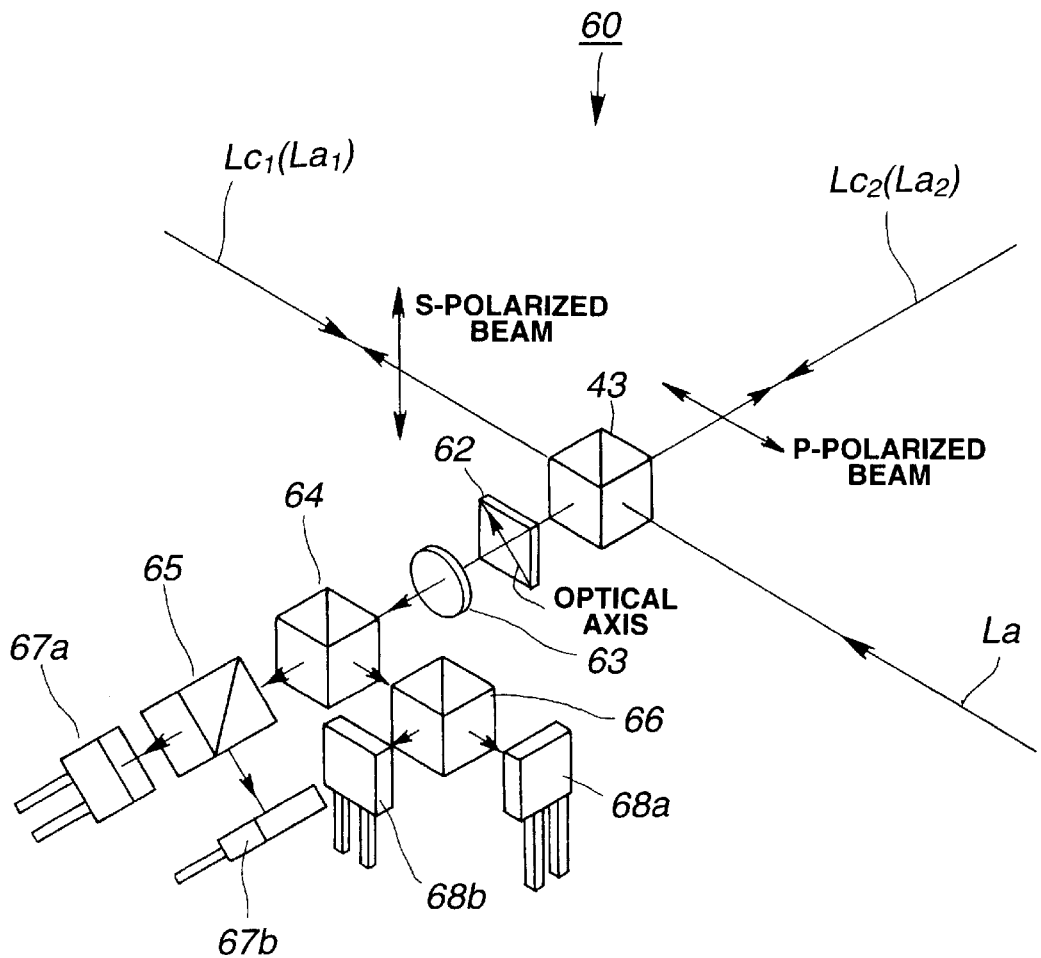
FIG. 30 is a schematic perspective view of a fourth embodiment of optical displacement measurement system according to the present invention.

Now, a fourth embodiment of optical displacement measurement system according to the present invention will be described below by referring to FIG. 30. Note that the fourth embodiment is realized by partly modifying the components of the above described second and third embodiments. Therefore, the components that are same as or similar to the counterparts of the above described second and third embodiments will be denoted respectively by the same reference symbols and will not be described any further.

The fourth embodiment of optical displacement measurement system 60 uses a ¼ wave plate 62, a fifth focussing element 63, a non-polarized beam splitter 64, a second polarized beam splitter 65 and a third polarized beam splitter 66 in places of the second focussing element 25 and the polarizing plate 46 of the irradiation/reception optical system 41. Therefore, the polarized beam splitter 43 used in the second and third embodiments will be referred to as the first polarized beam splitter 43 in the following description.

In this optical displacement measurement system 60, the light receiving element 13 is replaced by a first pair of light receiving elements 67a, 67b and a second pair of light receiving elements 68a, 68b.

The coherent beam La emitted from the coherent light source 12 is made to enter the first polarized beam splitter 43 of the irradiation optical system 41 with its angle of polarization inclined by 45 degree. The polarized beam splitter 43 of the irradiation optical system 41 splits the incident coherent beam La into two coherent beams La1, La2 that are polarized in respective senses perpendicular relative to each other. The coherent beam La1 transmitted through the polarized beam splitter 43 of the irradiation optical system 41 becomes a P-polarized beam, whereas the coherent beam La2 reflected by the polarized beam splitter 43 becomes an S-polarized beam.

The twice-diffracted beam Lc2 diffracted twice by the diffraction grating 11 and the twice-diffracted beam Lc2 also diffracted twice by the diffraction grating 11 are made to enter the first polarized beam splitter 43 of the light receiving optical system 41. While the twice-diffracted beam Lc1 is originally a P-polarized beam, it becomes an S-polarized beam as its direction of polarization is rotated by 90 degrees by the reflection optical system 42. Similarly, while the twice-diffracted beam Lc2 is originally an S-polarized beam, it becomes a P-polarized beam as its direction of polarization is rotated by 90 degrees by the reflection optical system 42. Thus, the first polarized beam splitter 43 reflects the twice-diffracted beam Lc1 that is an S-polarized beam and transmits the twice-diffracted beam Lc2 that is a P-polarized beam before causing the two twice-diffracted beams Lc1, Lc2 to overlap with each other.

The two twice-diffracted beams Lc1, Lc2 that are overlapping with each other are then made to pass through the ¼ wave plate 62. The ¼ wave plate 62 is arranged with its optical axis inclined by 45 degree relative to the sense of polarization of each of the twice-diffracted beams Lc1, Lc2. Thus, the twice-diffracted beams Lc1, Lc2 become circularly polarized beams that are polarized in opposite senses as they pass the ¼ wave plate 62.

The twice-diffracted beams Lc1, Lc2 that are circularly polarized in opposite senses are then made to pass through the fifth focussing element 63.

The fifth focussing element 63 comprises an optical element such as a lens having a predetermined variable range of numerical aperture. The fifth focussing element 63 focusses the twice-diffracted beams Lc1, Lc2 on the light receiving planes of the first pair of light receiving elements 67a, 67b and the second pair of light receiving elements 68a, 68b with a predetermined beam diameter. The focal point may not necessarily be the point where the beam diameter is minimized. A point on the light receiving planes that minimizes the difference of the lengths of the optical paths of beams may alternatively be selected for the focal point.

After passing through the fifth focussing element 63, each of the twice-diffracted beams Lc1, Lc2 is split into two beams by the non-polarized beam splitter 64.

One of the obtained two beams is further split into two beams that are polarized in respective senses perpendicular relative to each other by the second polarized beam splitter 65. Then, they are made to enter the first pair of light receiving elements 67a, 67b. The other one of the obtained two beams is also split into two beams that are polarized in respective senses perpendicular relative to each other by the third polarized beam splitter 66 that is tilted by 45 degree relative to the second polarized beam splitter 65 in terms of angle of polarization. Then, they are made to enter the second pair of light receiving elements 68a, 68b.

The beam of light obtained by overlapping circularly polarized beams revolving in opposite senses can be regarded as linearly polarized beam revolving as a function of the phase difference of the two beams. Therefore, after passing the ¼ wave plate 62, the twice-diffracted beams Lc1, Lc2 will become a linearly polarized beam that revolves in response to the movement of the diffraction grating 11. Additionally, when the component beams of the linearly polarized beam that are differentiated by ω degree are taken out by a polarizing element such as a polarizing plate, the signals detecting the intensities of the taken out component beams will show a phase difference of 2ω. Thus, since the first pair of light receiving elements 67a, 67b detect the beams polarized in respective senses that are different from each other by 90 degree and taken out by the second polarized beam splitter 65, the detected signals show a phase difference of 180 degree. Therefore, signals deprived of the respective DC components can be detected by determining the difference of the signals detected by the first pair of light receiving elements 67a, 67b. It will be appreciated that the above description also applies to the second pair of light receiving elements 68a, 68b.

Furthermore, the beams taken out by the third polarized beam splitter 66 show an angular difference of 45 degrees relative to the beams taken out by the second polarized beam splitter 65. Therefore, the signals obtained from the second pair of light receiving elements 68a, 68b show a phase difference of 90 degrees relative to the signals obtained from the first pair of light receiving elements 67a, 67b. In other words, the differential signal of the signals detected by the first pair of light receiving elements 67a, 67b and the differential signal of the signals detected by the second pair of light receiving elements 68a, 68b show a phase difference of 90 degrees relative to each other. Thus, the moving direction of the diffraction grating 11 can be determined on the basis of the position signals showing a phase difference of 90 degrees and indicating the displaced position of the diffraction grating 11.

As described above, the fourth embodiment of optical displacement measurement system 60 can eliminate the influence of the transmittivity, the reflectivity and the diffraction efficiency of the diffraction grating 11 from the detected interference signal. Additionally, the optical displacement measurement system 60 can determine the moving direction of the diffraction grating 11.

Figure 31:
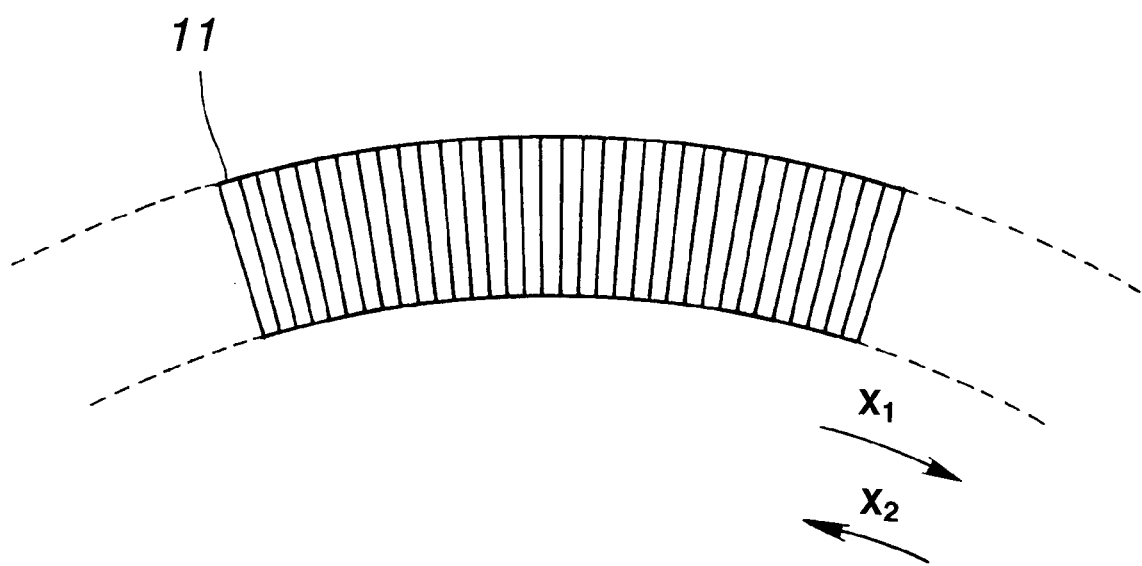
FIG. 31 is a schematic perspective view of an alternative diffraction grating that can be used for the first through fourth embodiments of the present invention.

The first through fourth embodiments of optical displacement measurement system according to the invention are described above. While a diffraction grating 11 having grids arranged at regular intervals and in parallel with each other is used in each of the embodiments of optical displacement measurement system, a diffraction grating configured differently may alternatively be used. For example, a diffraction grating having radially arranged grids as shown in FIG. 31 may be used. The displaced position of a movable part of a machine tool can also be detected by using a diffraction grating having radially arranged grids. Still alternatively, an amplitude type diffraction grating with varying brightness, a phase type diffraction grating with a varying refractive index or a varying profile may be used for the purpose of the invention. In short, the type of diffraction grating is not limited for the purpose of the invention.

While the diffraction grating 11 is fitted to a movable part of a machine tool and moves with the movable part in each of the above described embodiments of optical displacement measurement system, it is sufficient for the purpose of the invention that the irradiation optical system and the interference optical system move relative to the diffraction grating 11. For example, it may be sufficient for the purpose of the present invention that the diffraction grating is stationary and the irradiation optical system and the interference optical system move with the movable part of the machine tool.

The half mirrors, the beam splitters and the focussing elements used in any of the embodiments of optical displacement measurement system according to the invention are not limited to those made of thin film or a lens and they may alternatively be made of a diffraction optical element.

With an optical displacement measurement system according to the invention, coherent beams are focussed on the lattice plane of the diffraction grating by means of the first focussing means, while first diffracted beams are collimated and made to always perpendicularly strike the reflectors of the reflection optical system by means of the second focussing means. Therefore, if the optical axes of the first diffracted beams are displaced, the first diffracted beams reflected by the reflectors always follow the same optical paths backwardly they followed to strike the reflectors so that the spots where they are focussed on the lattice plane of the diffraction grating remain unchanged. Then, second diffracted beams produced from the first diffracted beams as the latter are diffracted are free from any displacement of optical axes and changes in the lengths of the optical paths.

As a result, in an optical displacement measurement system according to the invention, the two second diffracted beams will never be displaced and will always be caused to overlap and interfere with each other. Therefore, if the diffraction grating is moved in a direction other than the directions parallel to the lattice vector or the diffraction grating shows undulations, the interference signal detected by the system will never be degraded. Thus, the optical displacement measurement system can detect the displaced position of a movable part of a machine tool with an enhanced degree of resolution and precision.

Additionally, an optical displacement measurement system according to the invention provides an enhanced degree of freedom in terms of the position at which the diffraction grating is fitted to a movable part of a machine tool. Still additionally, it can reliably detect the displaced position of the diffraction grating if the movable part is vibrating or shaken. Still additionally, in the optical displacement measurement system, the diffraction grating and the irradiation/reception optical system, the reflection optical system and/or the interference optical system can be separated by a large distance by providing the first or second focussing means with a large aperture to allow the use of a small light receiving means and an enhanced degree of ease and freedom of designing the system configuration.

With an optical displacement measurement system according to the invention, no diffracted beams other than those that are to be diffracted for another time would be allowed to stray into the irradiation/reception optical system and the interference optical system so that noises can be minimized and the displaced position of the movable part can be detected with an enhanced degree of resolution and precision.

With an optical displacement measurement system according to the invention, any fluctuations in the DC attributable to the influence of the transmittivity, the reflectivity and the diffraction efficiency of the diffraction grating can be eliminated from the interference signal to be detected so that the displaced position of the movable part can be detected with an enhanced degree of resolution and precision.

With an optical displacement measurement system according to the invention, the optical paths of two coherent beams are arranged along a direction inclined relative to the direction perpendicular to the lattice plane of the diffraction grating and the two coherent beams are made to strike the lattice plane of the diffraction grating at a same and identical spot. Then, the phase difference of the two twice-diffracted beams produced from the two coherent beams is determined to detect the displaced position of the diffraction grating.

Therefore, with the optical displacement measurement system, the twice-diffracted beams can be made to overlap with each other, eliminating any diffracted beams of the 0-th degree or reflected beams coming from the diffraction grating and trying to stray into the irradiation optical system and/or the light receiving optical system so that the displaced position can be detected reliably and stably. Additionally, the optical displacement measurement system is free from errors attributable to fluctuations in the thickness and the refractive index of the diffraction grating so that the displaced position of the diffraction grating can be detected with an enhanced degree of precision.

What is claimed is:

1. An optical displacement measurement system comprising:
    a diffraction grating adapted to be irradiated with a coherent beam of light and move in directions parallel to a grating vector relative to the coherent beam for diffracting the coherent beam;
    light emitting means for emitting the coherent beam of light;
    an irradiation optical system for dividing the coherent beam of light emitted from said light emitting means into two coherent beams of light and irradiating said diffraction grating with each of the two coherent beams;
    a reflection optical system for reflecting each of a first pair of diffracted beams obtained from said coherent beams through diffraction by said diffraction grating and irradiating said diffraction grating with each of said first pair of diffracted beams;
    an interference optical system for causing each of a second pair of diffracted beams obtained by diffracting each of said first pair of diffracted beams to interfere with each other;
    light receiving means for receiving the second pair of diffracted beams interfering with each other and detecting an interference signal therefrom;
    position detecting means for determining a phase difference of said second pair of diffracted beams from the interference signal detected by said light receiving means and detecting a position of the diffraction grating having been relatively moved;
    said irradiation optical system having first focussing means for focussing the two coherent beams irradiating the diffraction grating on a grating plane of the diffraction grating; and
    said reflection optical system having reflecting means and second focussing means, said second focussing means collimating said each of said first pair of diffracted beams, and said reflecting means being positioned perpendicular to the light beams collimated by said second focussing means and reflecting the light beams backward so that the reflected beams trace a same optical path followed after being diffracted by the diffraction grating and then enter said second focussing means causing the focussed beams to focus at a same spot where the beams are diffracted.

2. The optical displacement measurement system according to claim 1, wherein said irradiation optical system is adapted to irradiate said diffraction grating with each of the coherent beams along a direction not perpendicular relative to the grating plane.

3. The optical displacement measurement system according to claim 1, wherein said first focussing means focusses the two coherent beams irradiating said diffraction grating at respective positions separated by a predetermined distance along the direction perpendicular relative to the grating vector.

4. The optical displacement measurement system according to claim 1, wherein said first focussing means focusses the two coherent beams irradiating said diffraction grating at an identical position on the grating plane of the diffraction grating.

5. The optical displacement measurement system according to claim 4, wherein said diffraction grating shows an angle of incidence for a coherent beam and an angle of diffraction grating shows an angle of incidence for a coherent beam and an angle of diffraction for a diffracted beam that are different from each other.

6. The optical displacement measurement system according to claim 1, wherein said irradiation optical system has a polarized beam splitter for splitting the coherent beam emitted from said light emitting means into two coherent beams with respective senses of polarization perpendicular relative to each other.

7. The optical displacement measurement system according to claim 6, wherein said interference optical system has:
    a first polarized beam splitter for causing two diffracted beams with respective senses of polarization perpendicular relative to each other to overlap with each other, a wave plate for circularly polarizing the two diffracted beams made to overlap with each other by the first polarized beam splitter in opposite senses relative to each other, a second polarized beam splitter for splitting each of the two circularly polarized diffracted beams into two interfering beams with respective senses of polarization perpendicular relative to each other and a third polarized beam splitter for splitting each of the two circularly polarized diffracted beams into two interfering beams with respective senses of polarization perpendicular relative to each other, said second and third polarized beam splitters being arranged to differentiate by 45 degrees the senses of polarization of the interfering beams being transmitted;
    said position detecting means being adapted for determining a differential output of the two interfering beams with different senses of polarization produced by said second polarized beam splitter and a differential output of the two interfering beams with different senses of polarization produced by said third polarized beam splitter to detect the relatively displaced position of said diffraction grating.

8. The optical displacement measurement system according to claim 1, wherein said diffraction grating is of a reflection type.

9. The optical displacement measurement system according to claim 1, wherein said diffraction grating has radially arranged grids.

10. The optical displacement measurement system according to claim 1, wherein said light emitting means emits a coherent beam of light capable of detecting a difference in the length of optical path as modulation factor.

11. An optical displacement measurement system comprising:

a diffraction grating adapted to be irradiated with a coherent beam of light and move in directions parallel to a grating vector relative to the coherent beam for diffracting the coherent beam;

light emitting means for emitting the coherent beam of light;

an irradiation optical system for splitting the coherent beam of light emitted from said light emitting means into two coherent beams of light and irradiating said diffraction grating with each of the two coherent beams;

a reflection optical system for reflecting each of a first pair of first diffracted beams produced respectively from said coherent beams as said coherent beams are diffracted by said diffraction grating and irradiating said diffraction grating with each of said first pair of diffracted beams;

an interference optical system for causing each of a second pair of diffracted beams produced respectively from said first pair of diffracted beams as the first pair of diffracted beams are diffracted by said diffraction grating;

light receiving means for receiving a second pair of diffracted beams interfering with each other and detecting an interference signal therefrom;

position detecting means for determining a phase difference of the second pair of diffracted beams from the interference signal detected by said light receiving means and detecting a position of the diffraction grating having been relatively moved;

said irradiation optical system being adapted to form optical paths respectively for said two coherent beams on a plane inclined relative to a direction perpendicular to a grating plane of said diffraction grating; and said reflection optical system having reflecting means and focussing means, said focussing means collimating each of said first pair of diffracted beams and said reflecting means being positioned perpendicular to the light beams collimated by said focussing means and reflecting the light beams backward so that the reflected beams trace a same optical path followed after being diffracted by the diffraction grating and then enter said focussing means causing the focussed beams to focus at a same spot where the beams were diffracted.

* * * * *